FIG_1

Aug. 11, 1964   S. H. CREED ETAL   3,144,061
FRUIT SPLITTING MACHINE
Original Filed Nov. 30, 1956   17 Sheets-Sheet 3

INVENTORS
SHERMAN H. CREED
SANDOR CSIMMA
BY *Hans G. Hoffmeister*
ATTORNEY

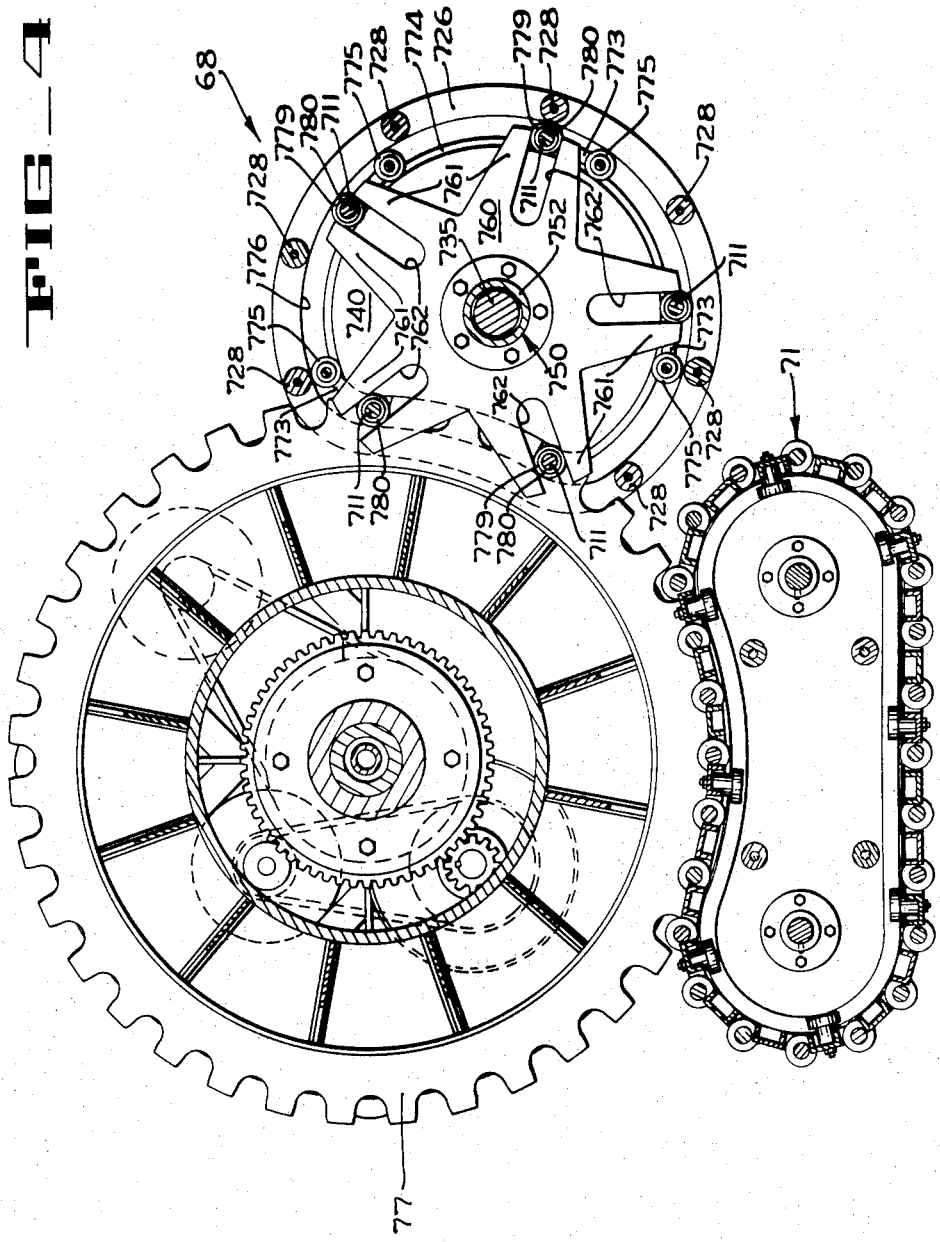

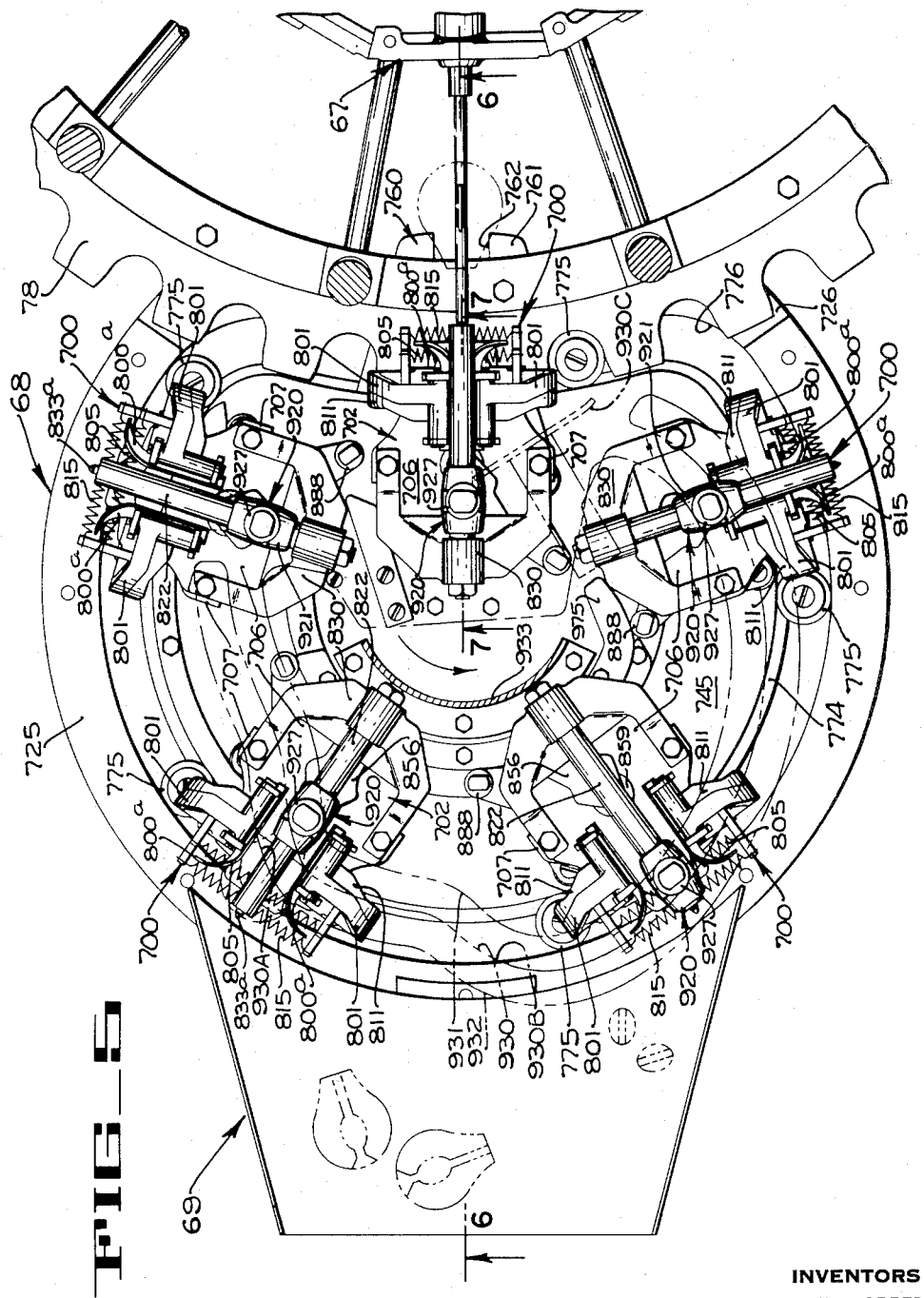
FIG_5

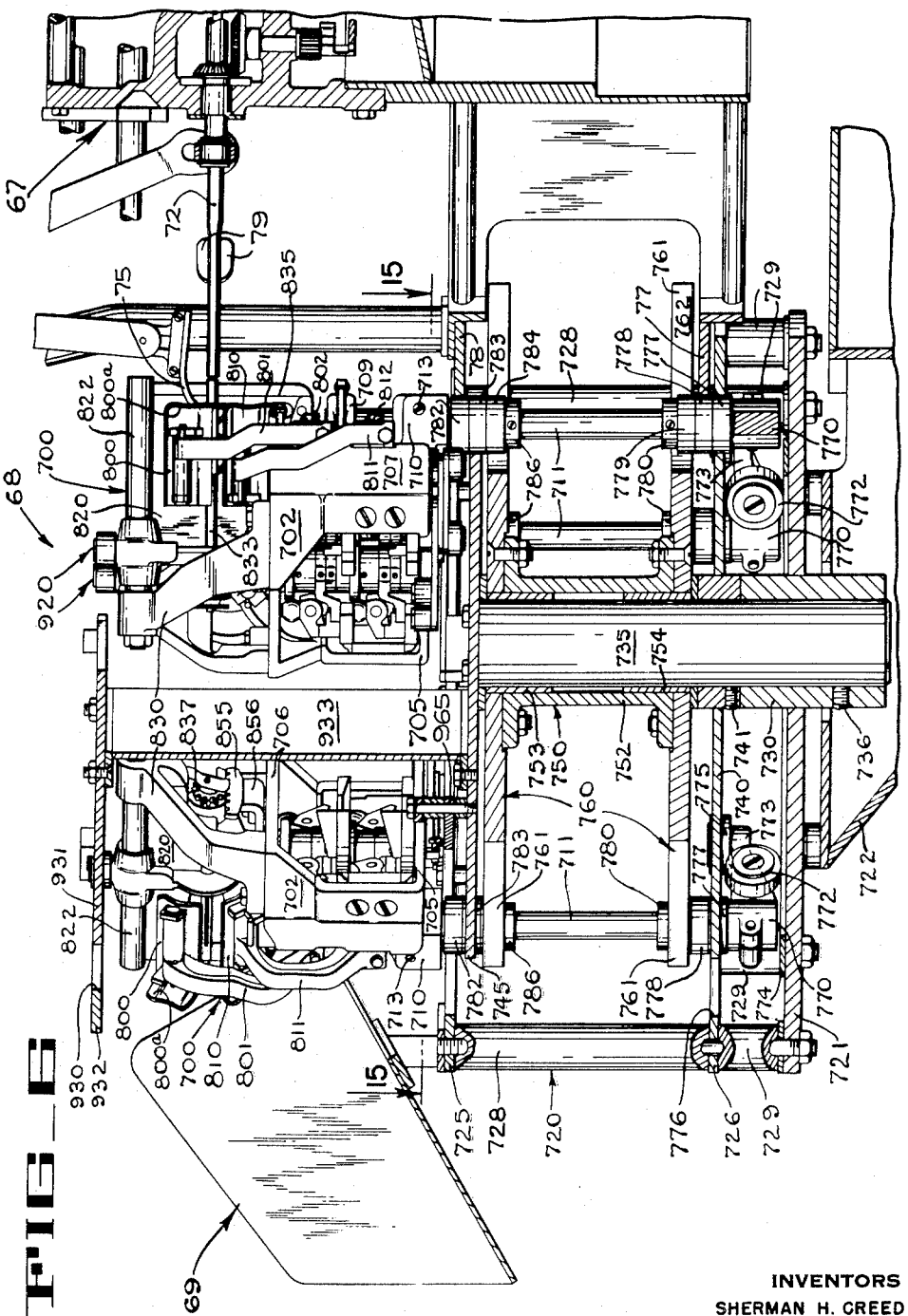

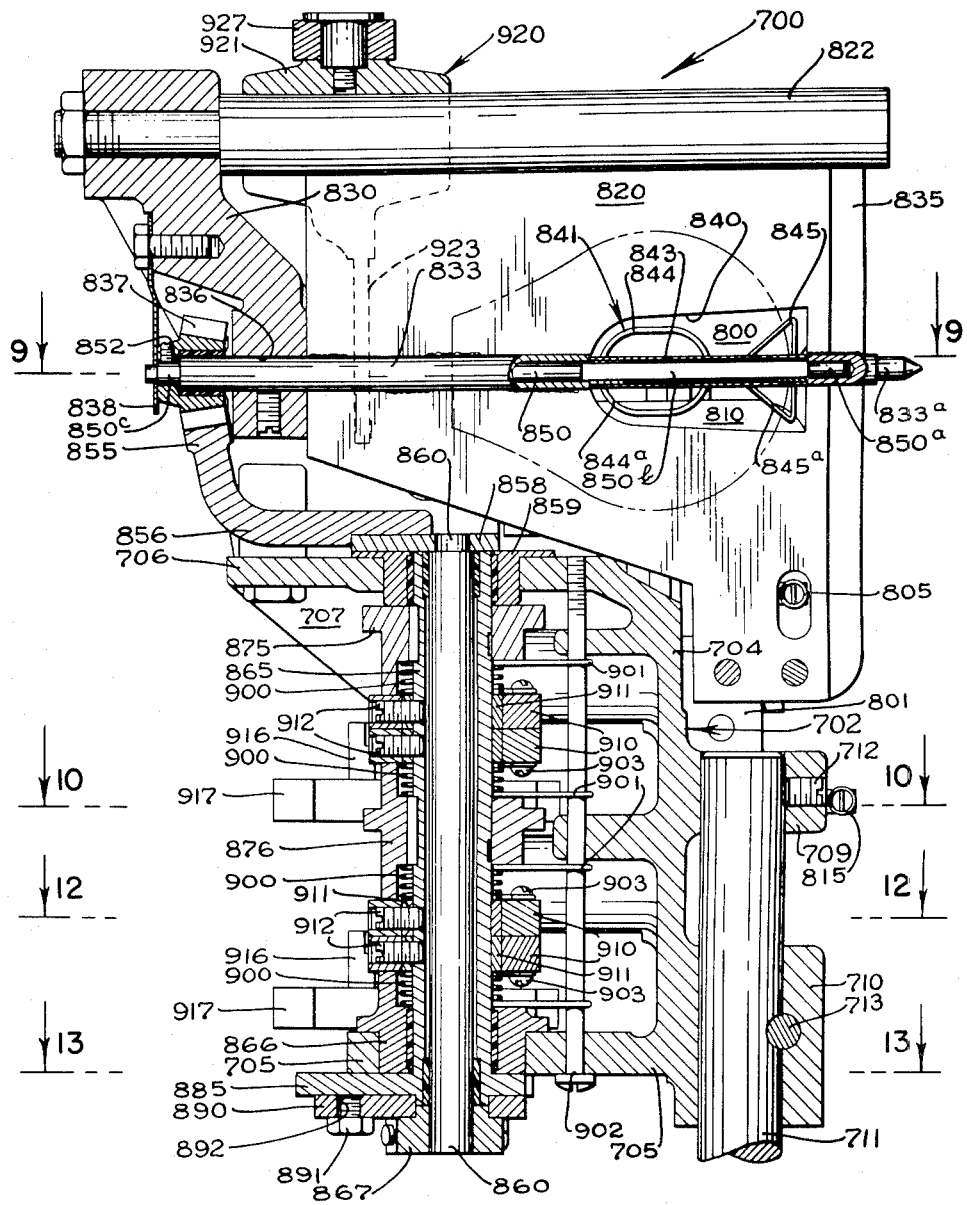
FIG_7

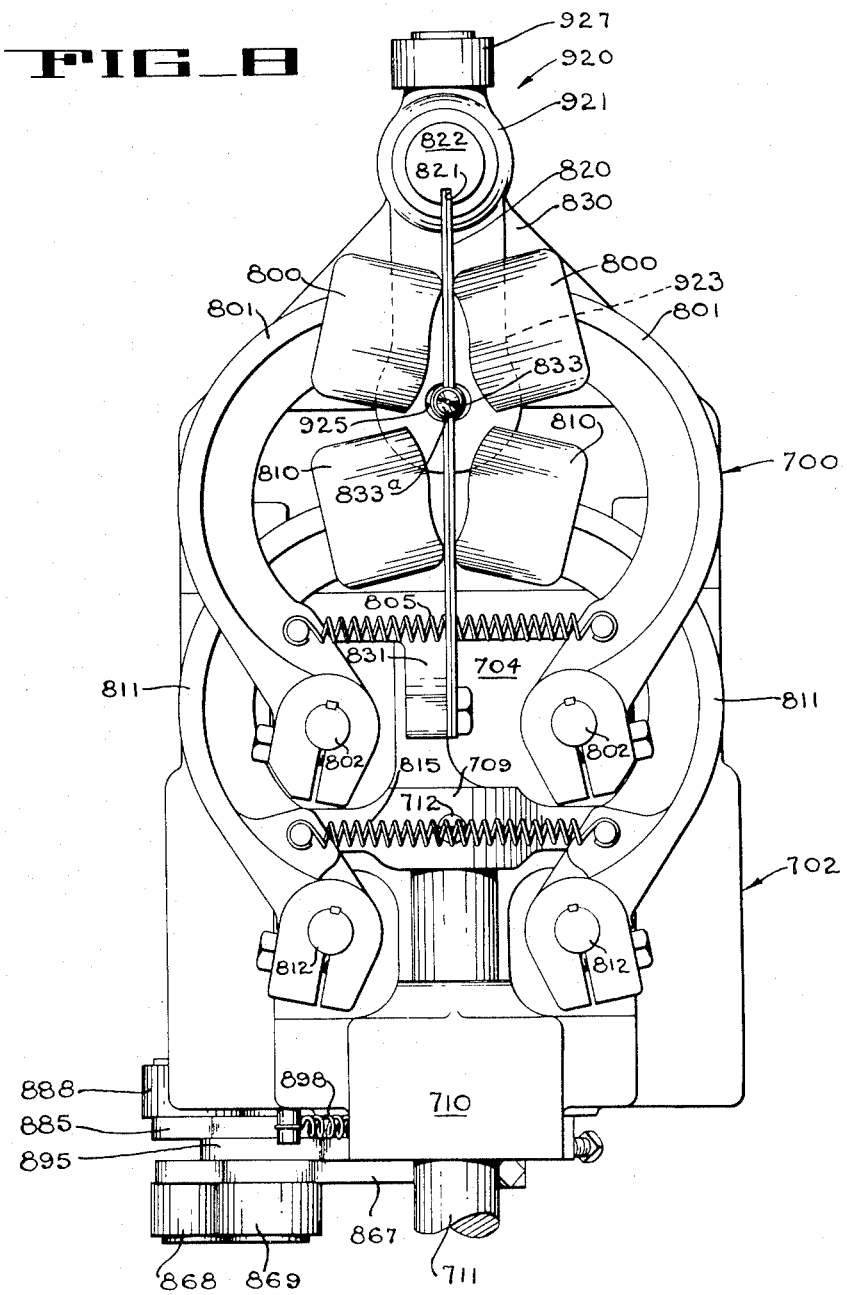

Aug. 11, 1964 S. H. CREED ETAL 3,144,061
FRUIT SPLITTING MACHINE
Original Filed Nov. 30, 1956 17 Sheets-Sheet 9

FIG_9

FIG_10

FIG_11

INVENTORS
SHERMAN H. CREED
SANDOR CSIMMA
BY Hans G. Hofmeister
ATTORNEY

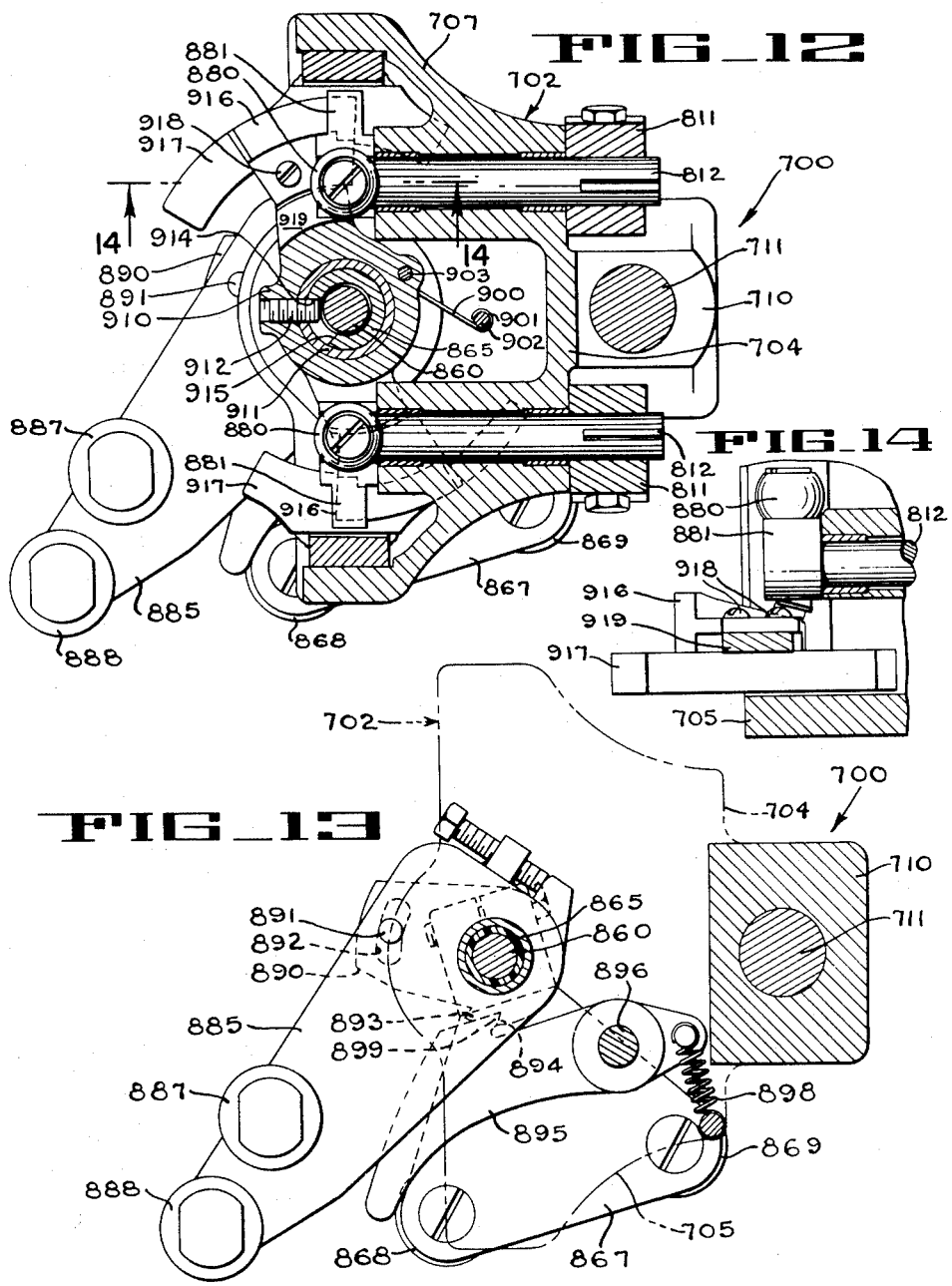

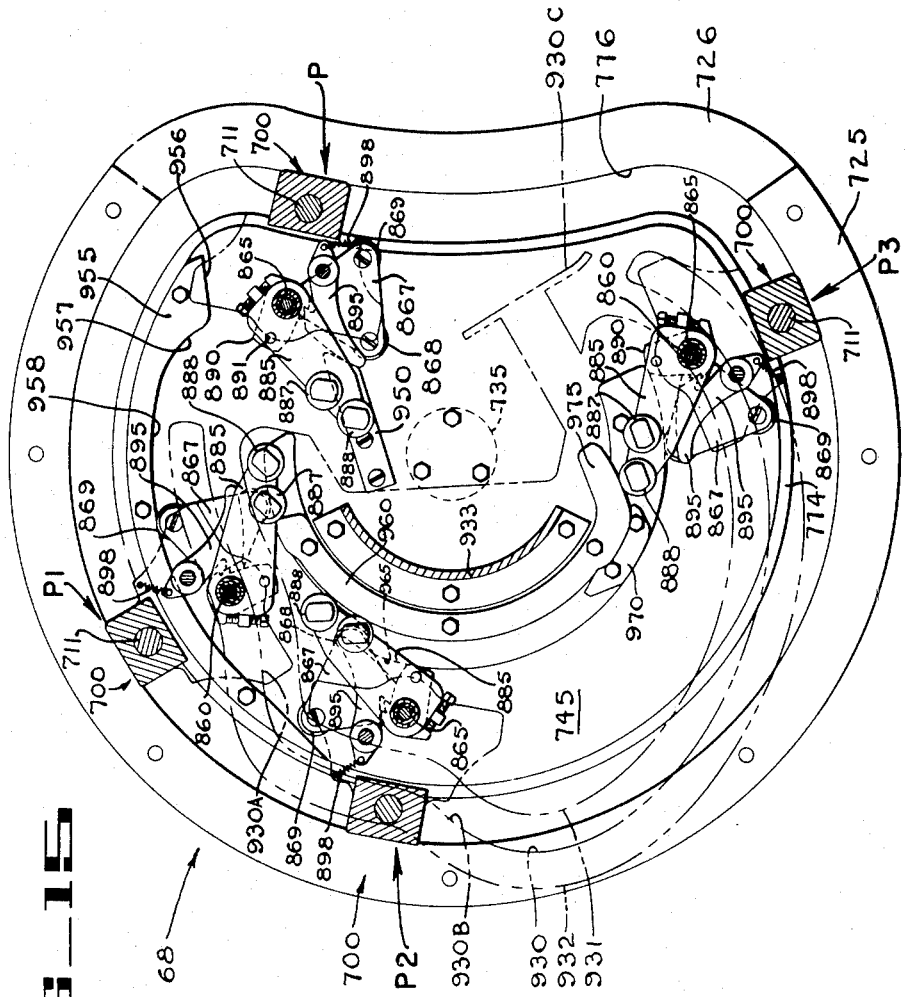

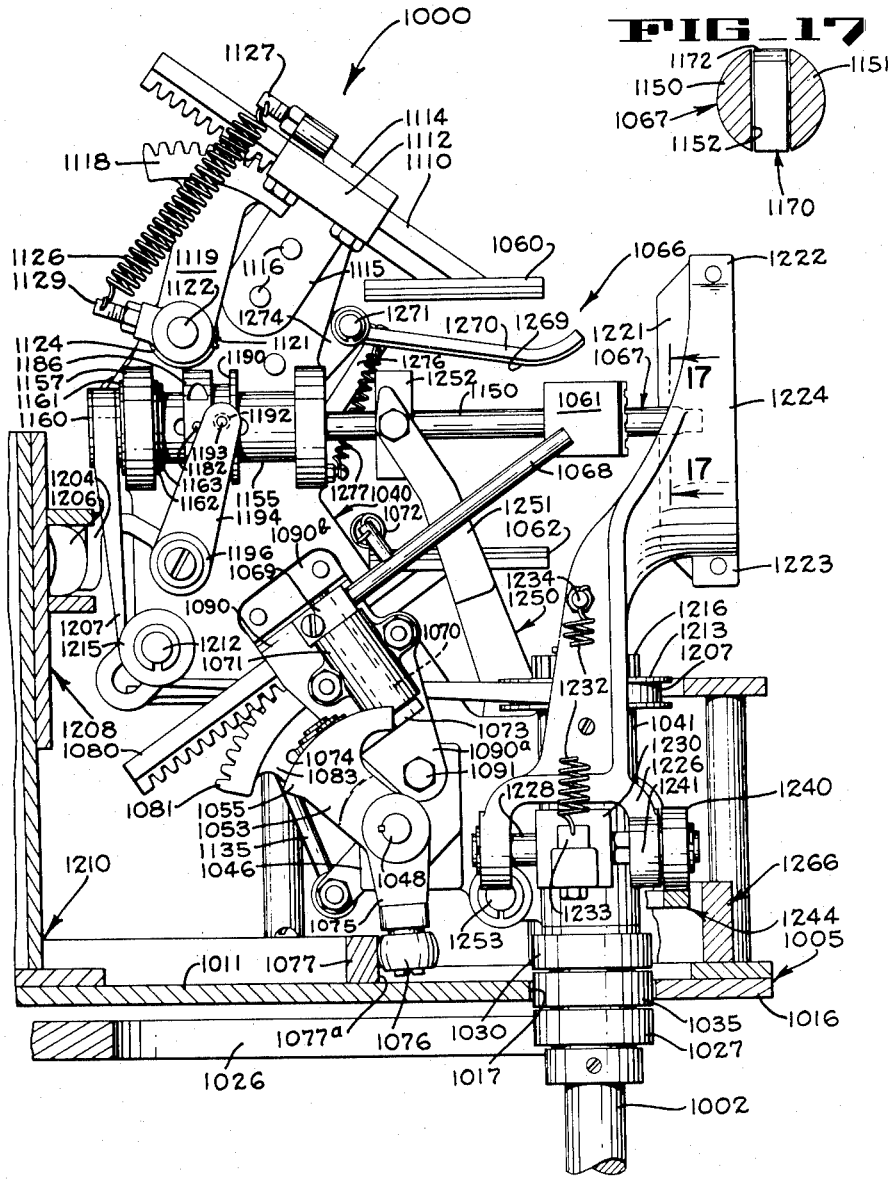

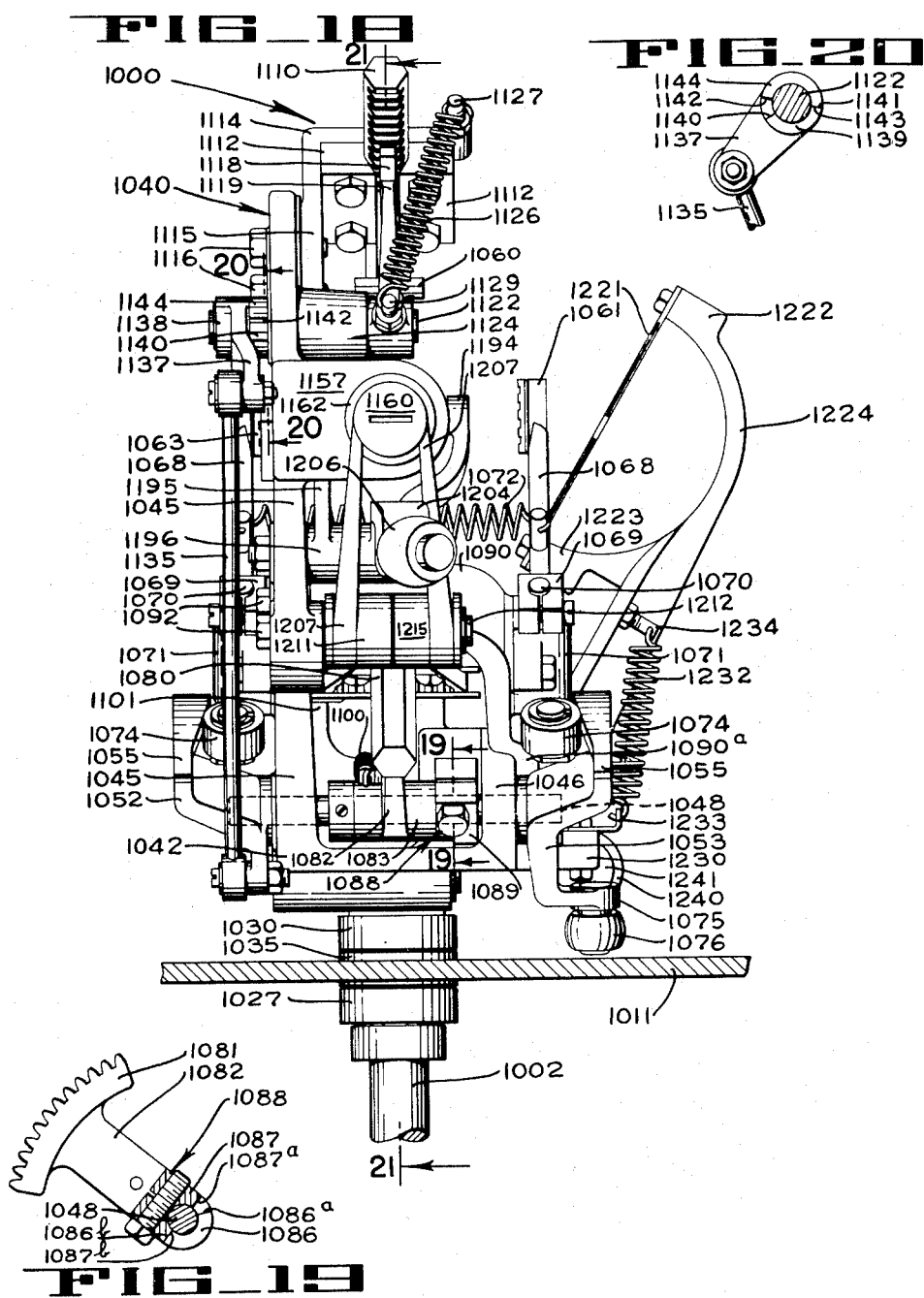

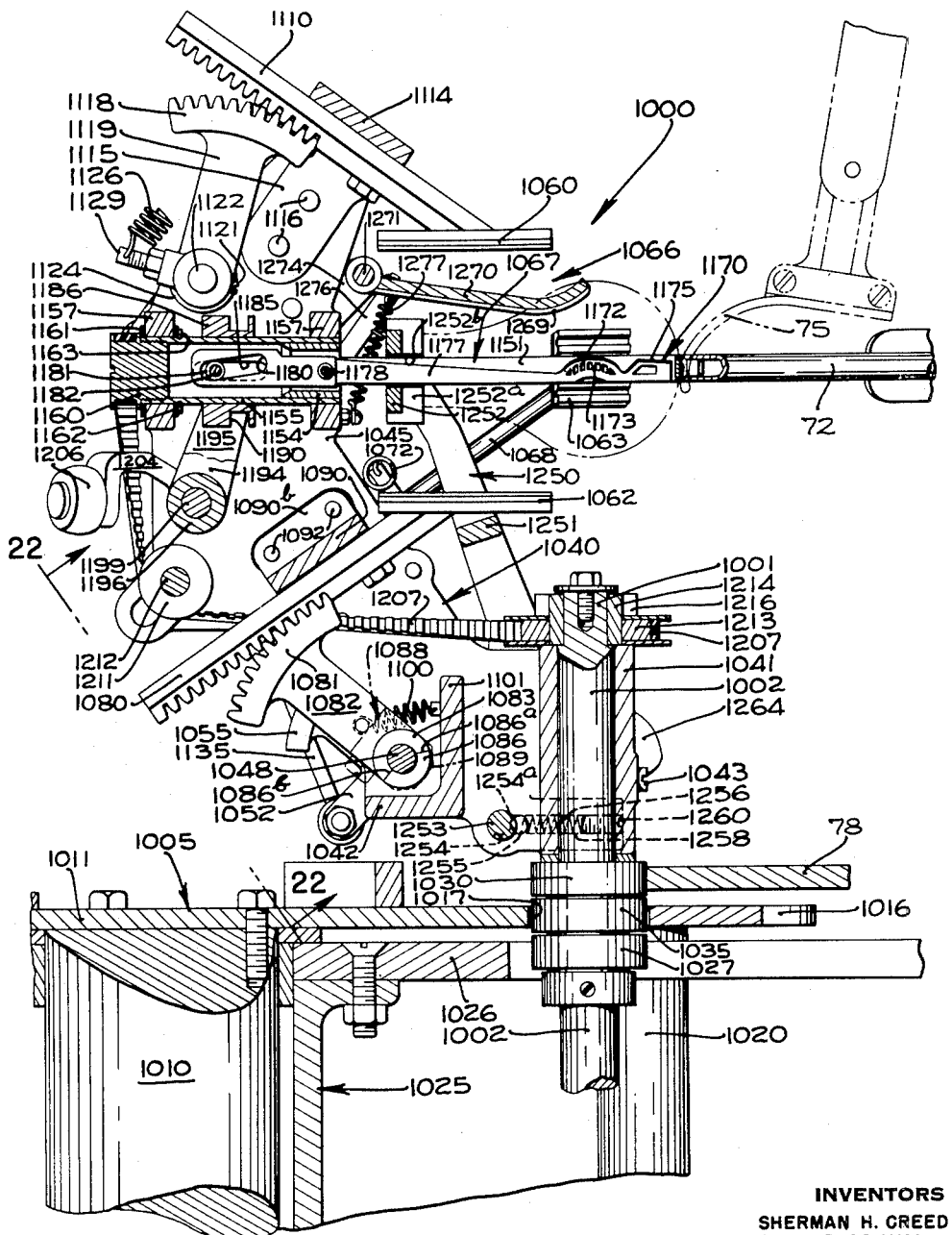

Aug. 11, 1964 S. H. CREED ETAL 3,144,061
FRUIT SPLITTING MACHINE
Original Filed Nov. 30, 1956 17 Sheets-Sheet 15
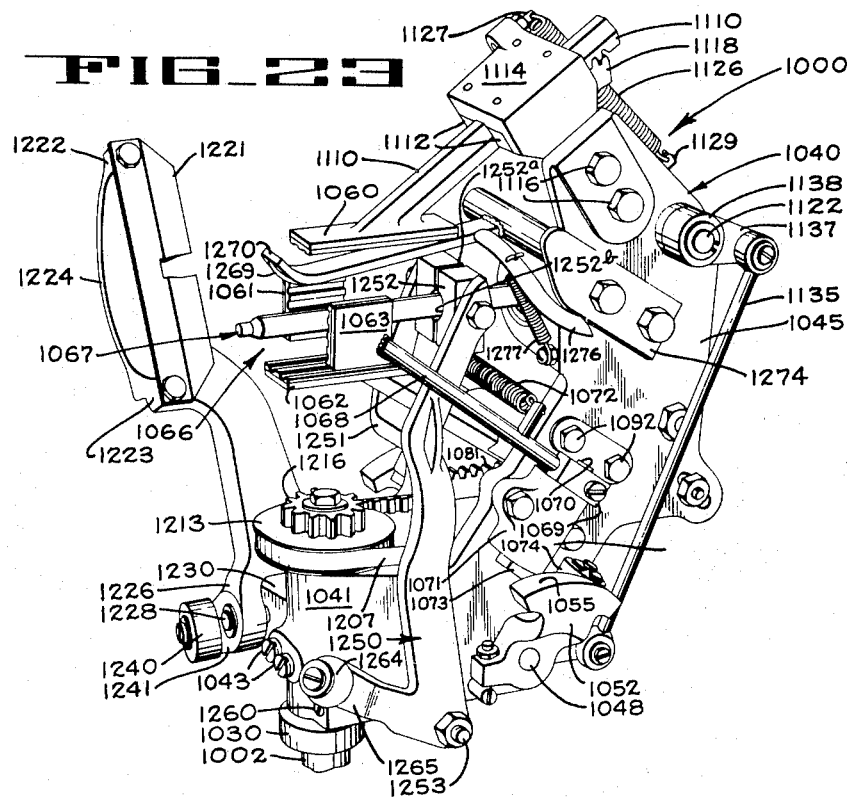
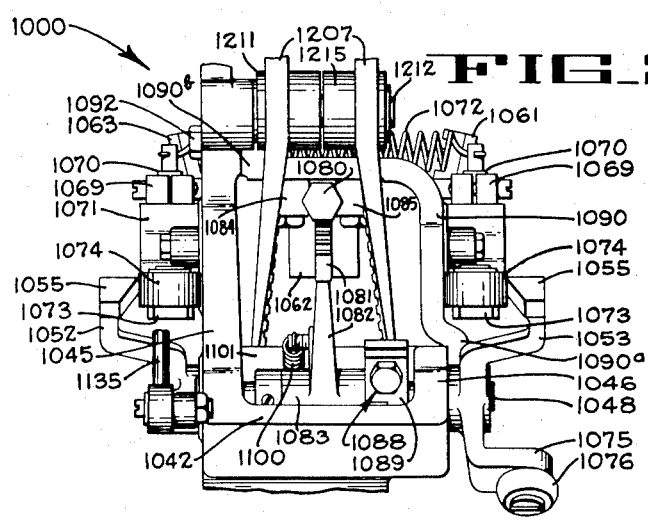
INVENTORS
SHERMAN H. CREED
SANDOR CSIMMA
ATTORNEY

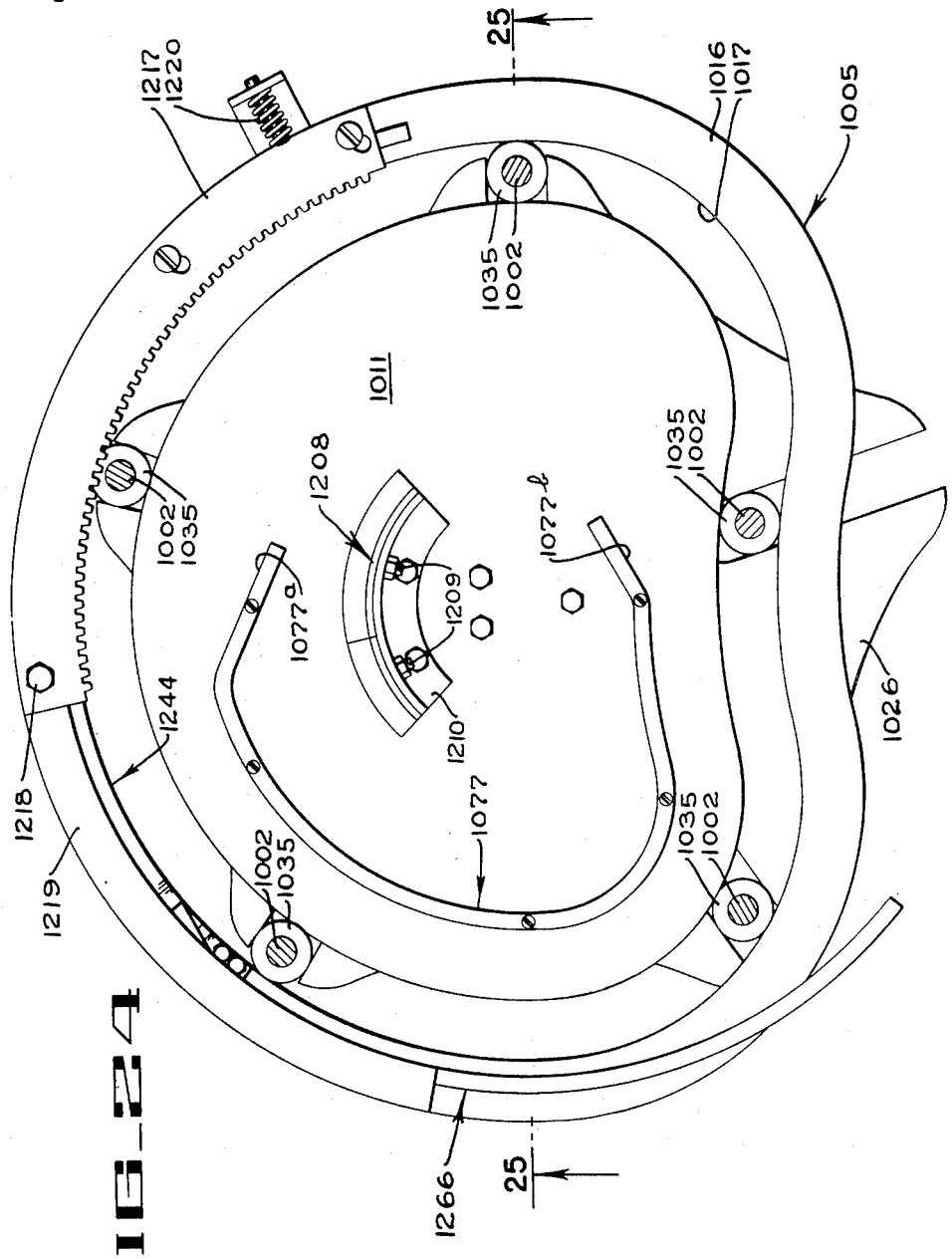

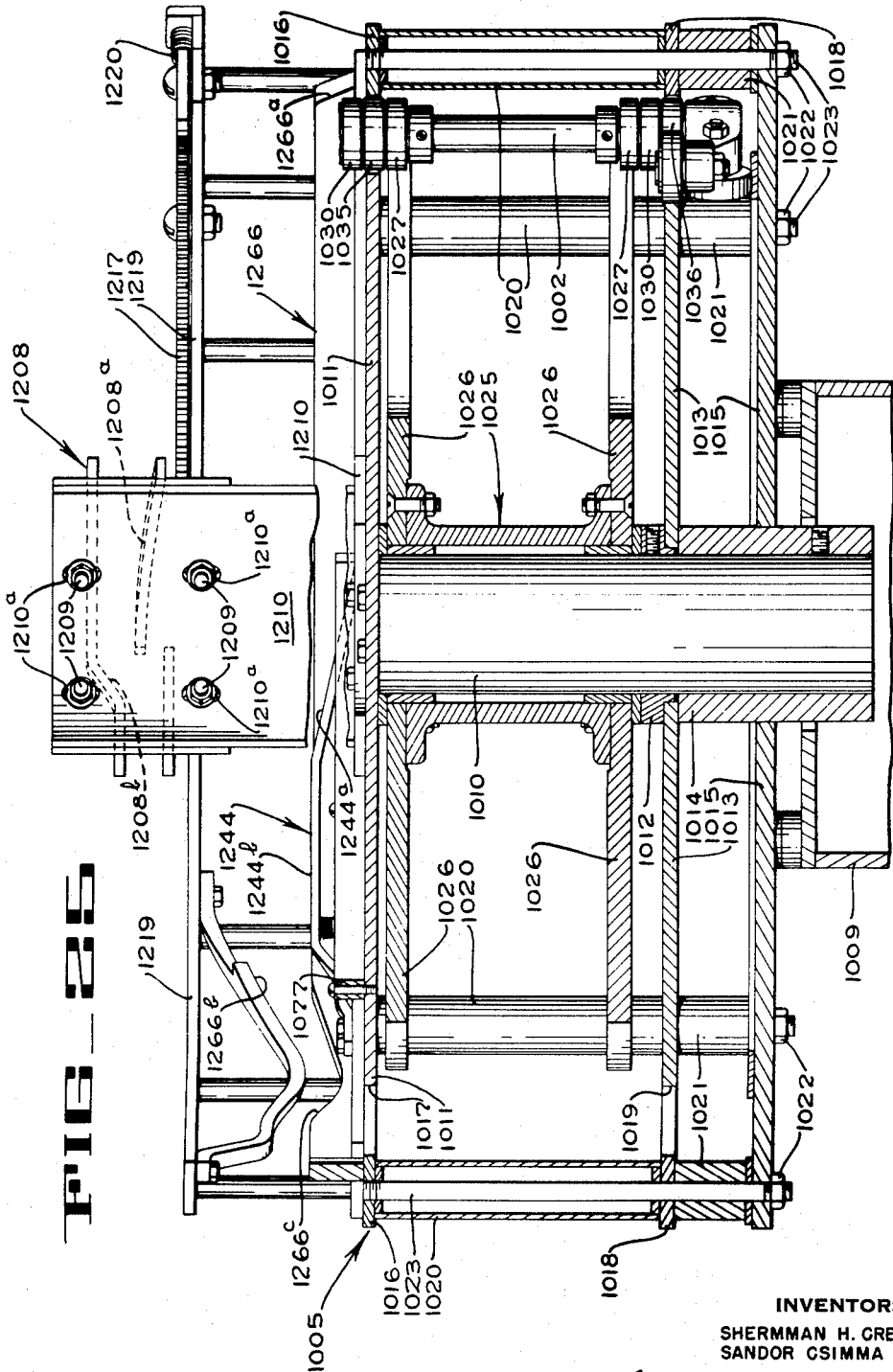

United States Patent Office 3,144,061
Patented Aug. 11, 1964

3,144,061
FRUIT SPLITTING MACHINE
Sherman H. Creed, San Jose, and Sandor Csimma, Sunnyvale, Calif., assignors to FMC Corporation, a corporation of Delaware
Original application Nov. 30, 1956, Ser. No. 625,368, now Patent No. 2,979,093, dated Apr. 11, 1961. Divided and this application Nov. 20, 1959, Ser. No. 854,334
10 Claims. (Cl. 146—72)

This invention appertains to a fruit handling machine and more particularly relates to improved apparatus for splitting and coring fruit, such as pears.

This application is a division of copending application Serial No. 625,368, filed November 30, 1956, now Patent No. 2,979,093, which issued on April 11, 1961.

An object of the present invention is to provide an efficient mechanism for splitting fruit and holding the split sections while the fruit is cored and trimmed.

Another object is to provide an improved mechanism for applying pressure to clamping members in which fruit is held during processing.

Another object is to provide an improved mechanism for coring a fruit and discharging the core material therefrom.

Another object is to provide an improved fruit splitting, coring and trimming head for a fruit preparation machine.

Another object is to provide an improved coring mechanism for a fruit preparation machine.

Another object is to provide an improved fruit splitting mechanism.

Another object is to provide a fruit preparation machine having means whereby a fruit splitting device may be selectively connected into the operating mechanism or disconnected therefrom.

Other and further objects and advantages of the present invention will become apparent from the following description taken in connection with the accompanying drawings:

FIG. 4 is a horizontal section taken on line 4—4 of FIG. 1.

FIG. 5 is an enlarged plan view, with parts in section, of the splitting, coring and stemming turret of the present machine with portions of the main turret shown in section.

FIG. 6 is a vertical section taken along line 6—6 of FIG. 5.

FIG. 7 is an enlarged vertical section taken along line 7—7 of FIG. 5.

FIG. 8 is an enlarged front elevation of a splitting, coring and stemming unit used in the turret of FIG. 5.

FIG. 9 is a horizontal section taken on line 9—9 of FIG. 7.

FIG. 10 is a fragmentary horizontal section taken on line 10—10 of FIG. 7.

FIG. 11 is a fragmentary vertical section taken on line 11—11 of FIG. 10.

FIG. 12 is a horizontal section taken on line 12—12 of FIG. 7.

FIG. 13 is a horizontal section taken on line 13—13 of FIG. 7.

FIG. 14 is a fragmentary vertical section taken on line 14—14 of FIG. 12.

FIG. 15 is a horizontal section taken on line 15—15 of FIG. 6 particularly showing the control cam plate used with the stemming and coring mechanism of the present invention.

FIG. 16 is a side elevation of a second embodiment of the splitting, coring and trimming head of the present invention.

FIG. 17 is a vertical section taken on line 17—17 of FIG. 16.

FIG. 18 is an end elevation of the head of FIG. 16.

FIG. 19 is a fragmentary vertical section taken on line 19—19 of FIG. 18.

FIG. 20 is a fragmentary vertical section taken on line 20—20 of FIG. 18.

FIG. 21 is a vertical section taken on line 21—21 of FIG. 18.

FIG. 22 is a fragmentary elevation taken looking in the direction of arrows 22—22 of FIG. 21.

FIG. 23 is a perspective of the head of FIG. 16.

FIG. 24 is a plan view, with parts in section of the support structure along which the head of FIG. 16 is moved, particularly showing the cam mechanism.

FIG. 25 is a fragmentary vertical section taken on line 25—25 of FIG. 24.

Figure 1:
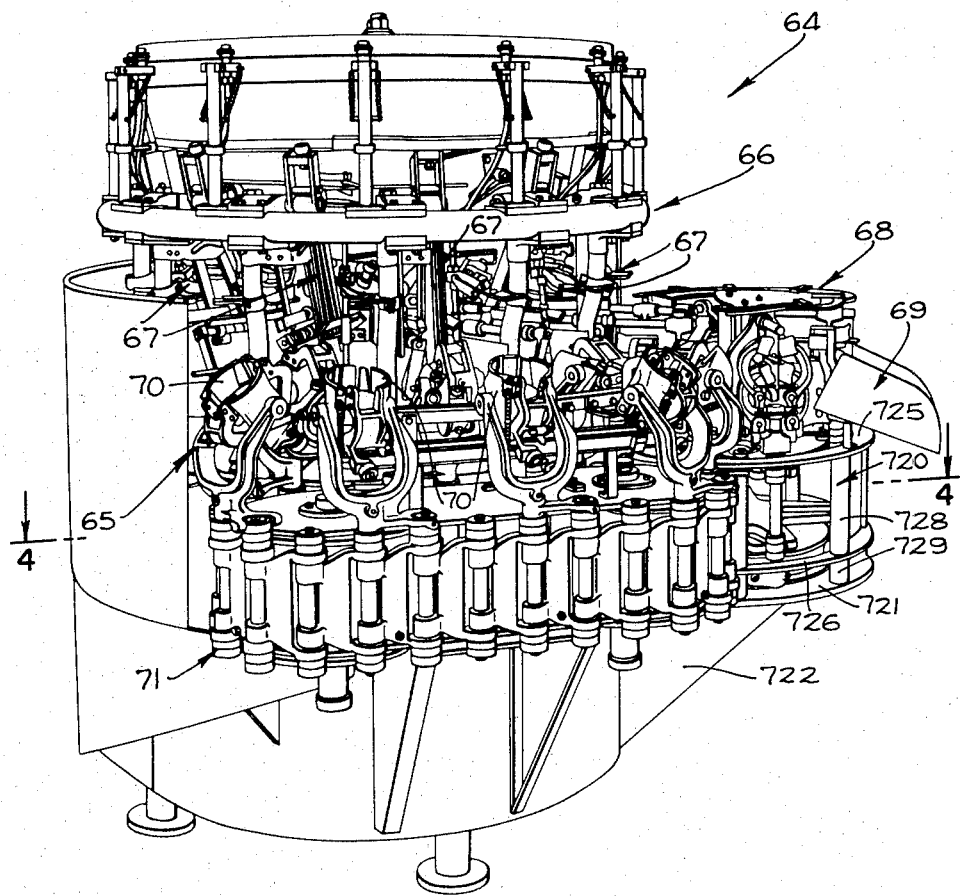
FIG. 1 is a perspective of the fruit preparation machine of the present invention.
Figure 2:
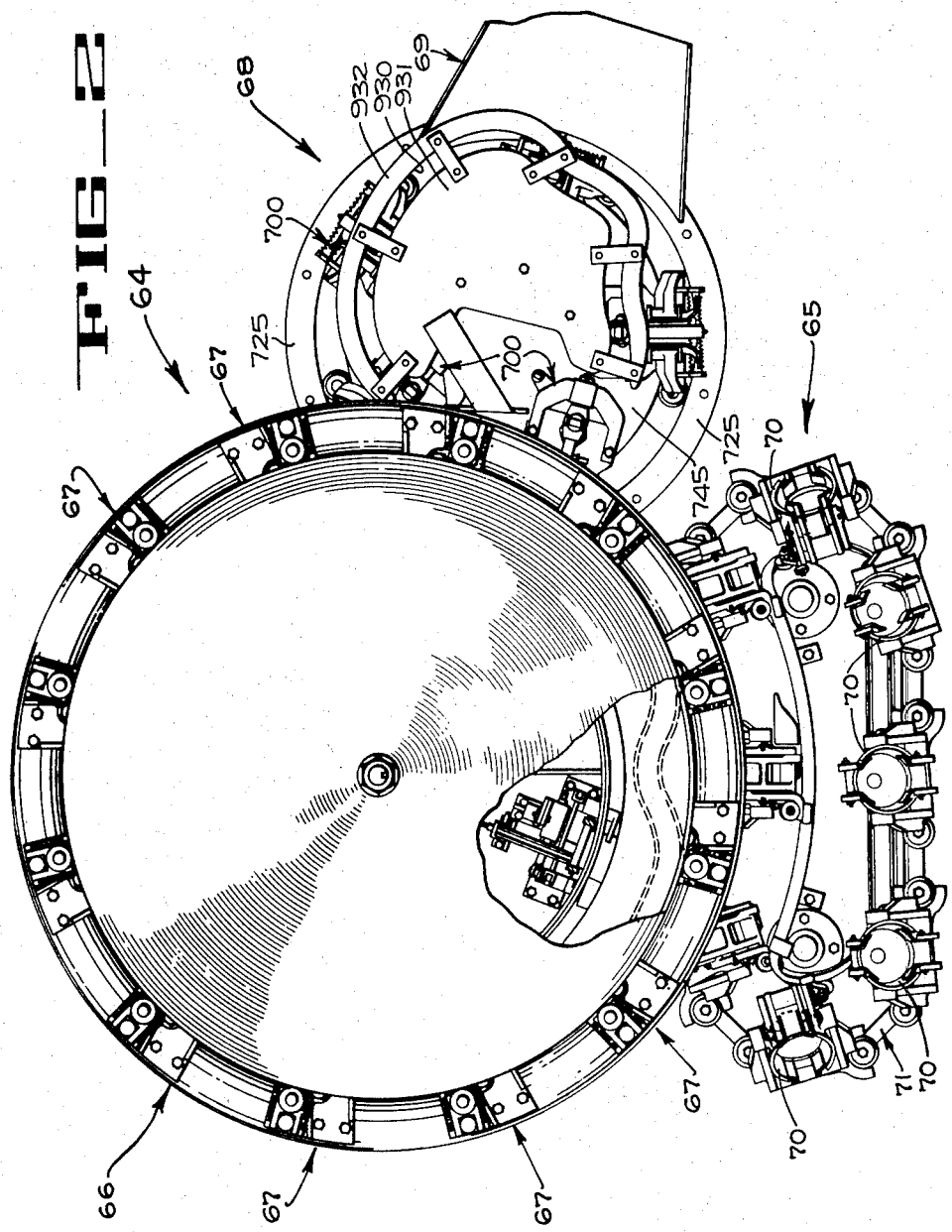
FIG. 2 is a plan view of the machine of FIG. 1, certain parts being broken away.
Figure 3:
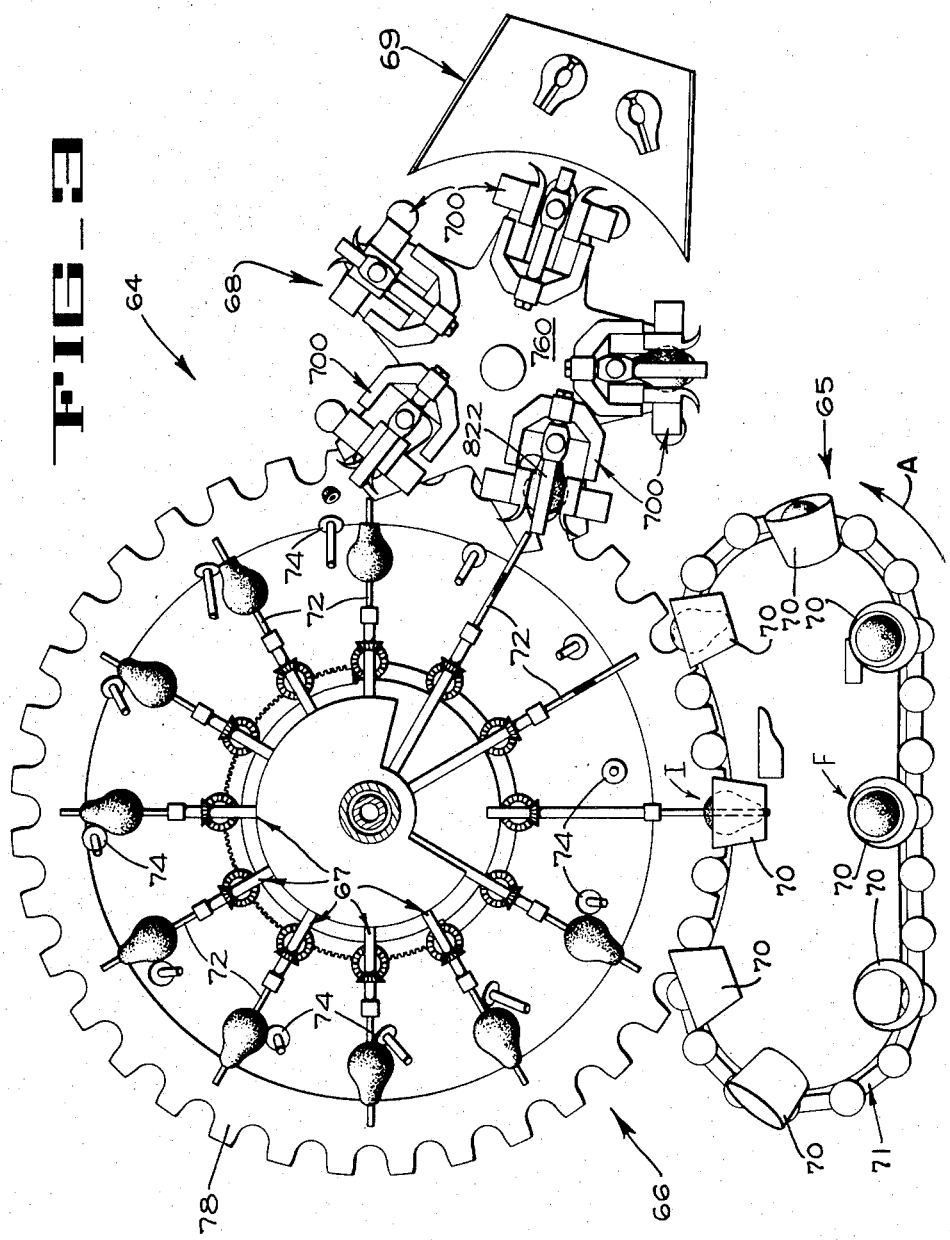
FIG. 3 is a diagrammatic plan view of a portion of the operating mechanism of the machine of FIG. 1.

The rotary pear processing machine of which the splitting, coring and discharging mechanism of the present invention is a part, is indicated generally in FIGS. 1, 2 and 3 by the reference numeral 64 and comprises a pear feed mechanism 65, a rotary main turret 66 which carries a plurality of peeling, coring and stem-end trimming units 67, and a discharge turret 68 which receives each peeled, cored and trimmed pear from the main turret 66 and performs successive splitting, seed-cell removing, and blossom-end trimming operations prior to depositing the two halves of the pear on a discharge chute 69.

Pears are individually fed by hand, stem end down, into feed cups 70 which are mounted on an endless chain carrier 71 that moves the cups 70 in a circuitous path in the direction of the arrow A, FIG. 3. The feed cups 70 are arranged to move the pears from a feed station F where their stem-blossom axes are substantially vertical to an impaling station I where said axes are horizontally disposed. At the impaling station I of the main turret 66, one of several stemming or impaling tubes 72 is moved radially outward of the turret 66 and impales one of the pears at its blossom-end and along its stem-blossom axis. While supported on the stemming tube 72, the stem and a portion of the seed cell of the pear are removed, the pear is peeled by one of several peeling mechanisms 74, and the stem-end of the pear is severed from the body of the pear by a cutting blade. The above referred to parts are described in detail in the previously mentioned parent application to which reference may be had for a description of the entire machine.

After the stem-end of the pear has been cut off, the pear is transferred by a cam actuated butt stop 75 (FIG. 6) to a splitting and coring head 700 on the discharge turret 68 (FIG. 3). There are five heads 700 (FIG. 5) on the turret 68 and they are arranged to travel in a generally circular path in timed relation to the stemming tubes of the processing units 67 on the main turret. The five splitting and coring heads 700 are identical and each head comprises a rigid metal housing 702 (FIGS. 6 and 7) which has a vertical front wall 704, a bottom wall 705, a top wall 706, and side walls 707. Two vertically spaced guide blocks 709 and 710 project outwardly from the front wall 704 to receive a shaft 711. A setscrew 712 and a transverse key 713 lock the shaft 711 to the housing.

The heads 700 are mounted in a rigid frame 720 (FIGS. 1 and 6) consisting of a base plate 721 which is supported from the machine base by a rigid inclined bracket 722. The frame 720 has an upper cam ring 725 and a lower cam ring 726 mounted in fixed position relative to the base plate 721 on spacer posts 728 and 729. A tubular hub 730 (FIG. 6) is secured, as by welding, in a central opening in the base plate 721. A central stationary shaft 735 is secured by a setscrew 736 to the hub 730. A lower cam plate 740, which is disposed in horizontal alignment with the lower cam ring 726, is secured by a setscrew 741 to the shaft 735. A plate 745 is bolted to the top of the stationary shaft 735 and a reel 750 is mounted for rotation in the stationary frame 720. The reel comprises a central tubular member 752 that is mounted for rotation in two spaced bushings 753 and 754 disposed around the stationary shaft 735. Identical star wheels 760 are bolted to the upper and lower ends of the central member 752. Each star wheel 760 (FIG. 4) has five arms 761 and each arm has a radial groove 762 at its outer end. The arms of the upper star wheel are disposed in vertical alignment with the arms of the lower star wheel.

A split hub 770 (FIG. 6) is clamped to the lower end of the shaft 711 of head 700, and a caster wheel 772, which is mounted for rotation on an arm 773 projecting from the hub 770, rolls along a circular track 774 on the base plate 721. Three rollers 777, 778 and 779 are mounted for rotation on the lower end of each shaft 711 between a set collar 780 and the split hub 770. A guide wheel 775 is rotatably mounted on the rearward, trailing end of each of the caster arms 773. Since each arm 773 is keyed to one of the shafts 711 of a head 700, a guide wheel 775 will determine the orientation of the head as it travels around the discharge turret. To assure that the head is moving in a path normal to the stemming tube at the time that the pear is transferred onto the splitting blade and to keep the head facing in a generally outwardly direction at all other times, the several guide wheels 775 and the rollers 777 are disposed in a cam track 776 (FIGS. 5 and 6) defined between the lower cam ring 726 and the lower cam plate 740. Near the upper end of each shaft 711, three rollers 782, 783 and 784 are mounted for rotation on the shaft between a set collar 786 and the lower guide block 710. A continuously driven main turret sprocket ring 77 (FIGS. 4 and 6) engages the roller 778 (FIG. 6) of each shaft 711. Similarly, a main turret sprocket ring 78 (FIGS. 3 and 6) engages the roller 782 (FIG. 6) on each shaft 711. Thus, the shaft 711 of each head 700 is engaged by both sprocket rings, and the reel 750 is rotated about the stationary shaft 735. It is to be noted that the sprocket rings of the main turret drivingly engage only one unit. This driven unit drives the star wheels which in turn drive the other units around the turret in spaced relation.

Each head 700 (FIGS. 5 and 8) has a pair of upper jaws or clamping pads 800 that are pivotally mounted at the upper end of curved arms 801. The arms 801 are keyed to shafts 802 which are journalled for rotation in the front wall of the housing 702. The pads 800 have outwardly curved leading end portions 800a (FIG. 5) which facilitate the insertion of a pear between the jaws. A spring 805 is connected between the arms of the upper jaws 800 to urge the jaws toward each other. Mounted directly below the upper jaws, and cooperating therewith to define a pear receiving chamber, is a pair of outwardly curved pads or lower jaws 810 which are pivotally mounted on curved arms 811 that are keyed to shafts 812 journalled in the forward wall 704. The lower jaws are connected together and urged toward each other by a spring 815. In their innermost position, the four pads bear against a pear splitting blade 820 that has an upper marginal edge tightly held in a slot 821 in a rod 822 that is secured to a vertical support wall 830 (FIG. 7) which is bolted to and extends upwardly from the rearmost portion of the upper wall 706 of the housing 702. The blade 820 is bolted at its lower forward end to a vertical flange 831 (FIG. 8) that projects forwardly from the housing 702. It is to be noted that the splitting blade 820 is disposed in the same plane as the fins 79 (FIG. 6) of the stemming tube 72 on the main turret. Accordingly, the cut made by the blade coincides with the cut made by the fins.

Throughout its length the blade is provided with a tubular portion 833 (FIG. 7) with a tapered forward end 833a which projects a short distance forwardly of a vertical cutting edge 835 and also having a rear end which projects a somewhat greater distance rearwardly of the rear edge of the blade to be received and locked in an opening 836 in the vertical support wall 830. A gear 837 is mounted for rotation on the rearmost end of the tubular portion 833 and is held thereon by a strap 838. Near its forward end, the blade 820 has an opening 840 in which a coring and trimming device 841 is mounted. This device comprises a tubular member 843 from which two diametrically opposed wire-like cutters 844, 844a, and opposed cutters 845 and 845a project outwardly in a radial direction. These cutters have a width that is equal to or less than the thickness of the portion of the blade 820 that is adjacent the opening 840. Accordingly, when the cutters are positioned in the vertical plane of the splitting blade 820, they do not interfere with the movement of the pear onto the blade. The forward cutters 845 and 845a are formed so that, when the tubular member 843 is rotated approximately 180 degrees, they will cut a frusto-conical portion from the blossom-end of the split pear. Similarly, the rearward cutters 844 and 844a are designed so that they will sever the seed cell of the split pear. When the shaft is rotated approximately 90 degrees the cutters 844 and 844a are disposed laterally from the plane of the splitting blade and provide a cage-like structure adapted to hold the seed cell in the aperture 840 of the splitting blade. It will be understood that the cutters 844, 844a, 845 and 845a have sharpened leading edges.

The tubular member 843 of the coring and trimming device 841 is rotated by means of a shaft 850 that is journalled for rotation throughout a major portion of its length in the tubular portion of the cutter blade. The shaft 850 also has a forward end portion 850a journalled in the tubular portion of the blade 820, a portion 850b of square cross section disposed in driving engagement with the square bore of the tubular member 843 of the device 841, and a rearward portion 850c secured to the gear 837 by a setscrew 852. The gear 837 is in mesh with a gear segment 855 that is formed on the upper end of a bent arm 856 which is secured by capscrews 857 (FIG. 9) to a pivot plate 858. The pivot plate 858 rests on the upper surface of a bearing member 859 (FIG. 7) and is keyed to a vertical shaft 860. The shaft 860 is journalled for rotation in a tubular shaft 865 which in turn is rotatably journalled in the bearing member 859 and in a lower bearing member 866, fixed in the lower wall 705 of the housing. The shaft 860 is oscillated by means of a triangular arm 867 (FIG. 13) that is clamped on the lower end of the shaft 860. Two spaced rollers 868 and 869 are rotatably mounted on the underside of the triangular arm 867 and these rollers are arranged to be actuated by cams, which will be described presently, so that the coring and trimming cutters may be rotated both clockwise and counterclockwise as seen in FIG. 8 at predetermined intervals during the processing of the pear. A spring 870 (FIG. 9) is connected between the bent arm 856 and the housing 702 and is arranged to pivot the arm 856 counterclockwise against a stop bar 871 which determines the position wherein the cutters 844, 844a, 845 and 845a are disposed in the plane of the splitting blade 820.

The jaws 800 and 810 are moved to open position by means of two rotary cams 875 and 876 (FIGS. 7 and 10) which are keyed to the tubular shaft 865. The cams 875 and 876 are identical and each cam has two diametrically opposed camming arms 877 and 878 (FIG. 10) which are arranged to engage rollers 880 (FIGS. 10 and 11). Each roller 880 is mounted for rotation on a pivot block 881 that is keyed on the rearmost end of one of the shafts 802 or 812 on which the jaws are mounted. When the shaft 865 is rotated in a counterclockwise direction (FIG. 10)

the camming arms 877 and 878 engage the associated rollers 880 and move them outwardly away from the center of the housing, causing the pivot blocks 881 to be pivoted (FIG. 11) and the shafts 802 and 812 to be rotated in the direction for opening the jaws.

The tubular shaft 865, to which the rotary cams 875 and 876 are keyed, is rotated in the counterclockwise, jaw-opening direction by a control lever 885 (FIGS. 7 and 13) which is formed integrally on a lower end of the tubular shaft 865 or is welded thereon. The lever 885 has two spaced rollers 887 and 888 mounted for rotation thereon, and has a latch plate 890 adjustably secured to the lower surface of the lever by a bolt 891 (FIG. 13) that extends through a slot 892 in the plate 890. The latch plate 890 is rotatably mounted on the extreme lower end of the tubular shaft 865, as seen in FIG. 7, and has two teeth 893 and 894 (FIG. 13) formed on one edge. A latching lever 895 is pivotally mounted on the lower wall 705 (shown in phantom lines in FIG. 13) of the housing 702 by a bolt 896. A spring 898 is connected between one end of the latching lever 895 and the housing 702 and urges the lever 895 in a clockwise direction to move a tooth 899 on the lever 895 into position behind one of the teeth 893 and 894 on the latching plate 890 to prevent clockwise pivoting of the control lever 885.

The tubular jaw control shaft 865 is urged in a clockwise, jaw-closing direction by a plurality of torsion springs 900 (FIG. 7), each of which encircles the shaft 865 and has one end 901 hooked around a long screw 902 that extends vertically through the housing 702. The other end of each spring 900 is secured by a screw 903 to the face of a ring 910 (FIG. 12) that has a pressed-in bushing 911 rotatable on the shaft 865. As each ring 910 is urged in a clockwise direction (FIG. 12) by the associated torsion spring 900, a screw 912, which extends in a radial direction through the ring 910, engages an end wall 914 of an arcuate groove 915 cut in the shaft 865 opposite the ring. When the screw 912 abuts the end wall 914, the shaft 865 will be rotated with the ring 910.

It should be noted in FIG. 13 that, when the first tooth 893 of the latch plate 890 is engaged by the tooth 899 of the latching lever 895, the tubular jaw control shaft 865 is in a first angular position of adjustment wherein the jaws are wide open. When the tooth 899 is engaged behind the second tooth 894, the shaft 865 is in a second position which is disposed clockwise from the first position and which defines a second jaw position wherein the pivot blocks, on which the jaw pivot shafts are mounted, have been released by the cam rings 875 and 876 and the jaws are urged toward each other only by the urging of the two springs 805 and 815 (FIG. 8). This second position is the position of the jaws when the pear is pushed onto the splitting blade. Accordingly, the jaws will open and will accommodate their position to the size of the pear.

When the lever 885 has been pivoted clockwise from the position of FIG. 13 to a third position wherein the tooth 899 of the latching arm 895 is out of engagement with either of the teeth of the latch plate 890, wedge blocks 916 (FIGS. 12 and 14), which are carried on the wedge support rings 910, are moved by the urging of the torsion springs into wedging engagement between shelves 917 formed on the inner wall of the housing and the underside of the pivot block 881. As seen in FIG. 12, a wedge block 916 is secured by a screw 918 to the outer end of each of two diametrically opposite arms 919 of each wedge support ring 910. Thus, in the third position of angular adjustment of the tubular jaw control shaft 865, the loaded jaws are urged inwardly toward each other by the wedge blocks. As will be explained presently, the jaws are moved to this third position after a pear has been forced over the splitting blade and is ready to be cored and trimmed.

When the wedge blocks are resiliently urged into contact with the pivot blocks, the jaws are urged inwardly to grip the pear with a certain amount of load resulting from the impact of the wedges. This gripping of the pear is sufficient to hold the pear while the seed cell is cut out and the blossom-end is trimmed.

When the split pear has been cored and trimmed, the jaws are opened and the two halves of the pear are pushed away from the blade 820 by a pusher mechanism 920 (FIGS. 7 and 8) which comprises a hub 921 mounted for sliding movement on the bar 822 at the upper end of the head. A paddle 923 extends downwardly from the hub 921 on each side of the blade 820, and each paddle has an arcuate recess 925 adjacent the tubular portion 833 of the blade. A cam roller follower 927, which is mounted on the upper end of the hub, is arranged to ride in an overhead cam track 930 (FIGS. 2 and 6) defined by an inner plate 931 and an outer strap 932 which are secured together and supported in spaced relation above the stationary frame 720 (FIG. 6) by a vertical bracket 933. The cam track 930 is so designed that the pusher paddles 923 are moved radially outwardly to eject the cored and trimmed pear halves from their position adjacent the blade 820 at a point where the pear halves can fall into the discharge chute. After the pear halves are discharged, the pusher paddles are moved further outwardly to eject the seed cell from the cutters 844 and 844a, causing the seed cells to fall at a different part of the discharge chute.

The operation of the discharge turret 68 will be described in connection with FIG. 15 wherein the various cams that operate the mechanisms of each coring and trimming head 700 are shown. The operations of a coring head 700, as it travels around the shaft 735, are shown by the positions of the control levers 885, 867 and 895 of the coring head in positions indicated as P, P1, P2 and P3 in FIG. 15. After a pear has been pushed onto the splitting blade, the head 700 begins its movement in a counterclockwise direction around the axis of shaft 735. It is to be noted that at the time the pear is pushed onto the splitting blade, the main shaft 865 of the head is in the above-mentioned second angular position wherein only the springs 805 and 815 urge the clamping pads against the pear. In this position the tooth 899 on the latch lever 895 is engaged with the second tooth 894 of the control plate 890. Soon after leaving the pear splitting station, the latch lever 895 engages a cam 950 that is secured to the upper surface of the fixed plate 745. The latch lever is pivoted in a counterclockwise direction, disengaging the teeth, and permitting the control shaft 865 to be swung to the third angular position by the several torsion springs 900. In this position the clamping pads are loaded and locked by the wedging action of the wedge blocks.

After the clamping pads have been preloaded, the roller 869 of the triangular cutter control lever 867 is engaged by a cam 955 that has an inwardly extending surface 956 which swings the lever 867 clockwise to rotate the coring and trimming cutters 844, 844a, 845 and 845a through 180 degrees. In this manner, the seed cell is severed from the pear halves and the butt or calyx end is trimmed. As the head continues its movement the roller 869 engages an outwardly extending camming surface 957, and the cutters are rotated 90 degrees counterclockwise so that the cutters lock the seed cell and the calyx material in the blade. The roller 869 is then moved along a surface 958 that causes the cutters to be held in the 90 degree rotated position.

In order that the pear halves may be pushed away from the blade 820, the clamping pads 800 and 810 are moved to their open position by the engagement at position P1 of the roller 887 with a cam 960 which causes the shaft control lever 885 to be swung counterclockwise, permitting the tooth 899 of the latching lever 895 to engage the first tooth 893 to hold the clamping pads open. When the pads are opened, the roller 927 of the push off mechanism is urged radially outwardly by the surface 930A of the overhead cam track 930 which is shown in phantom lines in FIG. 5. After the pear halves have been ejected, the cutter control lever 867 is pivoted counterclockwise at position P2 by the engagement of the roller 868 with a cam 965, following the release of the roller 869 by the camming surface 958 which is terminated. When the cutters are returned to the plane of the blade 820, the seed cell and the calyx material is released, and further outward movement of the paddles 923 along cam surface 930B pushes this material away from the blade and into the discharge chute.

Before another pear can be pushed onto the splitting blade 820, the clamping pads must be latched in the pear receiving position wherein the tooth 899 is engaged with the second tooth 894 of the control lever 885. To effect this, a cam 970 is positioned to engage the latch lever 895 to swing that lever counterclockwise and disengage the tooth 899 from the first tooth 893. At the same time, a cam 975 engages the roller 888 of the control lever 885 so that this spring-urged lever is permitted to swing slowly in a clockwise direction at position P3. Since the latch lever 895 is urged counterclockwise by the spring 898, the tooth 899 will move into engagement behind the second tooth 894 and stop the pivoting movement of the control lever 885 with the clamping pads in the spring-loaded pear receiving position.

A guide bar 930C is supported from the overhead plates 931 and 932 that define the cam track 930. The bar 930C is arranged to intercept the roller 927 of the pear push-off mechanism and return the push-off paddle to a radially inner position so that another pear can be pushed onto the splitting blade.

A second embodiment 1000 of the splitting, coring and stemming head of the present invention is illustrated in FIGS. 16–25, inclusive. Each head 1000 (FIG. 21) is mounted on the upper, reduced diameter end 1001 of a shaft 1002 that is supported in a stationary frame structure 1005 in substantially the same manner as the shafts 711 of the heads 700 are supported in the frame 720 (FIG. 6).

The stationary frame structure 1005 (FIG. 25) comprises a central shaft 1010 to which is secured a top cam mounting plate 1011, the hub 1012 of a circular plate 1013, and the hub 1014 of a circular plate 1015 that is mounted on a rigid stationary base 1009. A ring 1016 is mounted in the horizontal plane of the cam mounting plate 1011 and is spaced therefrom to define a cam track 1017. Similarly a ring 1018 is mounted in spaced relation to the plate 1013 to define a cam track 1019. The rings 1016 and 1018 and the plate 1015 are held in spaced relation by studs 1023, each of which is in threaded engagement with the ring 1016 and extends through spacer members 1020 and 1021 to receive a nut 1022 on its lower end. A reel 1025 is rotatably mounted on the shaft 1010 and has two spaced star wheels 1026 that are arranged to engage spaced rollers 1027 on the shaft 1002. Two other spaced rollers 1030 on each shaft 1002 are engaged by the sprocket rings 77 (FIG. 4) and 78 (FIG. 3) of the main turret. When the main turret is rotated, the sprocket rings move each shaft around the stationary frame structure with spaced rollers 1035 and 1036 on the shaft being disposed in guided relation in the cam grooves 1017 and 1019, respectively. During this guided movement, the star wheels maintain the several shafts 1002 in spaced angular relation.

Each head 1000 (FIGS. 18 and 21) has a housing 1040 that has a tubular front wall portion 1041 (FIG. 21), which is adapted to receive the upper end of the shaft 1002, and a flat, rear base plate 1042. Setscrews 1043 lock the tubular front wall 1041 to the shaft 1002. As seen in the rear elevation (FIG. 18), the flat rear base plate 1042 has a high wall 1045 extending upwardly from one side thereof and a relatively low wall 1046 extending upwardly from the other side. A shaft 1048 is mounted for rotation in the side walls 1045 and 1046 and projects outwardly from said side walls to receive two levers 1052 and 1053 which are secured thereto by setscrews (not shown). Each of the levers 1052 and 1053 has a wedge block 1055 integrally formed on one end, for a purpose which will be explained presently.

The head 1000 has four clamping pads 1060, 1061, 1062 and 1063 (FIG. 23) which define a pear-receiving chamber 1066 at the front of the head around an impaling rod 1067. Each of the two side pads 1061 and 1063 is mounted on a rod 1068 (FIGS. 18 and 23) that has a split end 1069 clamped on a short shaft 1070 which is journalled for rotation in a bearing 1071 secured to one of the side walls 1045 or 1046 of the housing. The two rods 1068 are drawn toward each other by a spring 1072 (FIG. 18) which is connected between the rods. At the lower end of each bearing 1071, one end of a lever 1073 (FIG. 16) is keyed to the shaft 1070 while the other end of the lever carries a roller 1074 which is in engagement with the wedge block 1055 that is carried on the lever 1052 or 1053. The lever 1053 has an arm 1075 which carries a roller 1076 that rides along the surface of a cam 1077.

The cam 1077 (FIG. 24) is in the form of a bar that is secured to the upper plate 1011 of the stationary frame structure 1005. The cam bar 1077 has a camming surface 1077a that is arranged to swing the lever 1053 in a counterclockwise direction (FIG. 16) causing the wedge blocks 1055 to force the rollers 1074 inwardly (FIG. 18) toward the walls of the housing. As the roller 1074 moves inwardly the shafts 1070 are pivoted in the bearings 1071 and the clamp pads 1061 and 1063 are moved outwardly away from the impaling rod 1067 against the resistance of the spring 1072. The cam 1077 also has a camming surface 1077b (FIG. 24) which releases the lever 1053, permitting the clamp pads to move inwardly to engage a pear.

The lower clamp pad 1062 (FIG. 21) is mounted on a rack 1080 that is in mesh with a gear segment 1081 formed on the end of an arm 1082 that has a hub 1083 freely rotatable on the shaft 1048. The rack 1080 has a hexagonal cross section (FIG. 22) and is slidably disposed in guided relation in recesses in the confronting side walls of blocks 1084 and 1085, respectively. The guide blocks 1084 and 1085 are secured to the undersurface of a curved bracket 1090 which has one end 1090a (FIG. 16) secured to the short wall 1046 by a capscrew 1091 and the other end 1090b (FIG. 22) secured to the high wall 1045 by capscrews 1092 (FIG. 23). The hub 1083 of the gear arm 1082 has a partially cylindrical extension 1086 (FIG. 21) that has two flat abutment faces 1086a and 1086b (FIG. 19) disposed opposite abutment faces 1087a and 1087b, respectively, of a drive portion 1087 of a clamp 1088. The clamp 1088 has a portion 1089 (FIG. 18) that encircles the shaft 1048 and is clamped thereto.

A spring 1100 (FIG. 21) is tensioned between a fixed transverse wall 1101 of the housing and the lever 1082 and tends to urge the lever in a clockwise direction and moves the abutment surface 1086b of the hub extension 1086 into contact with the surface 1087b of the clamp 1088 that is secured to the shaft 1048. It will be evident that when the shaft 1048 is rotated clockwise (FIG. 16) to permit the spring 1072 to close the side clamp pads 1061 and 1063, the spring 1100 will resiliently urge the gear arm in a clockwise direction to move the lower pad 1062 toward a pear on the impaling rod 1067. If the pad 1062 contacts the pear before the shaft 1048 has completed its pivoting movement, the inward movement of the lower pad will stop while the shaft 1048 will continue to rotate to the end of its travel. Thus the space between the abutment surfaces 1087a and 1086a (FIG. 19) permit the shaft 1048 to rotate without corresponding rotation of the gear arm 1082.

The upper clamp pad 1060 (FIG. 21) is mounted on a rack 1110 that is hexagonal in cross section and is mounted for sliding movement in opposed recesses in two guide blocks 1112 (FIG. 23) which are secured to a bracket 1114. The bracket 1114 has a mounting flange 1115 (FIG. 21) secured to the upper end of the high wall 1045 by capscrews 1116. The rack 1110 is in mesh with a gear segment 1118 formed on a gear arm 1119 that is secured by a setscrew 1121 to a shaft 1122. The shaft 1122 is rotatably journalled in a boss 1124 (FIG. 18) that is formed on the wall 1045. The gear arm 1119 is urged in a clockwise direction (FIG. 16) by a spring 1126 which is connected between a stud 1127 disposed in the bracket 1114 and a stud 1129 disposed in the hub of the gear arm 1119.

When the lower shaft 1048 is urged in a clockwise direction (FIG. 16), as mentioned above, the upper shaft 1122 is also urged clockwise through a rod 1135 (FIG. 18) that is pivoted at its lower end to the lever 1052 and at its upper end to an arm 1137 that has a hub 1138 freely rotatable on the shaft 1122. The hub 1138 has a partially cylindrical extension 1139 (FIG. 20) that has radial abutment faces 1140 and 1141 which are opposite faces 1142 and 1143, respectively, formed on a radially projecting drive flange 1144 that is formed on the shaft 1122. When the shaft 1048 is rotated clockwise, the rod 1135 is raised, causing the arm 1137 to be rotated clockwise (FIG. 20) and allowing the shaft 1122 to be rotated clockwise by spring 1126. As the extension 1139 moves in a clockwise direction, the spring 1126 urges the gear arm 1119 clockwise (FIG. 16), moving the upper clamp pad 1060 toward the pear. If the inward movement of the pad 1060 is stopped before the shaft 1122 has completed its rotary movement, the lost motion connection between the hub extension 1139 and the shaft flange 1144 permits the hub extension to continue rotation for a predetermined distance without corresponding movement of the shaft 1122.

In summary, when the roller 1076 (FIG. 16) rides up the cam surface 1077a, the lower shaft 1048 is pivoted counterclockwise causing the wedge blocks 1055 to swing the rods 1068 outwardly and move the side clamp pads 1061 and 1063 to open position. Counterclockwise movement of the shaft 1048 causes the abutment face 1087b (FIG. 19) to engage face 1086b of the gear arm hub extension 1086 and move the gear arm counterclockwise (FIG. 16), thereby moving the lower clamping pad 1062 to open position. At the same time the rod 1135 (FIG. 20) is moved downwardly and the abutment face 1141 on the hub extension 1139 is brought into engagement with the face 1143 and the gear arm 1119 (FIG. 16) is swung counterclockwise to move the upper jaw to open position.

The impaling rod 1067 (FIG. 16) is an elongated member comprising two spaced side wall members 1150 and 1151 (FIG. 17), each of which has a partially circular cross section. The side wall members are spaced apart to provide a vertical slot 1152. At their inner end, the wall members 1150 and 1151 are secured to a cylindrical member 1154 (FIG. 21) that is pressed in a tube 1155 which is mounted for rotation in two spaced bearing arms 1157 projecting from the high wall 1045. A gear 1160 is threaded in the end of the tube 1155 so that rotation of the gear will cause rotation of the tube. A bronze washer 1161 is disposed between the gear 1160 and the rear bearing arm 1157 and a washer 1162 is disposed between the rear bearing arm 1157 and a spring clip 1163 which locks the tube 1155 against axial movement in the bearing arms 1157.

A cutter 1170 is disposed in the slot 1152 between the side wall members of the impaling rod. The cutter has a curved longitudinal cutting edge 1172 and transverse cutting edges 1173 which engage and cut up the seed cell of a pear on the impaling tube. A calyx end-trimming cutting edge 1175 is formed near the outer end of the cutter 1170. The cutter 1170 has a long shaft 1177 that is pivotally mounted on a pin 1178 that is secured in the short cylindrical member 1154. Near its innermost end the shaft 1177 has an inclined slot 1180 which receives a roller 1181 that is disposed on a pin 1182. The roller 1181 and the pin 1182 extend through two aligned slots 1185 in the opposite side walls of the rotatable tube 1155 and are received in a collar 1186. Since the slots 1185 extend axially of the tube 1155 and the slot 1180 in the cutter shaft 1177 is inclined relative to the axis of the tube, movement of the roller 1181 in the slots 1185 will cause pivoting movement of the cutter shaft 1177, causing the cutting edges at the outer end of the shaft to be moved in or out of the slot. If the roller 1181 is moved toward the right from the position of FIG. 21, the cutting edges will be moved progressively out of the impaling tube to engage and cut the seed cell and the calyx end of the pear. When the roller 1181 is moved toward the left, the cutting edges will be withdrawn into the impaling tube.

The roller 1181 is moved axially of the tube 1155 by means of the collar 1186 which is slidable on the tube 1155 and has an annular groove 1190. A roller 1192 (FIG. 16), which is disposed in the groove 1190, is rotatably mounted on a pin 1193 that is pressed in an arm 1194. A similar roller (not shown), which is mounted in the same manner on an arm 1195 (FIG. 21), is disposed in the groove 1190 diametrically opposite the roller 1192. Both of the arms 1194 and 1195 are integrally formed on a hub 1196 (FIG. 18) that is freely rotatable on a shaft 1199 secured to and projecting outwardly from the wall 1045. A cam arm 1204 (FIG. 16), which is integrally formed on the hub 1196, carries a cam roller 1206 which rides on the camming surfaces of a cam plate 1208 (FIGS. 24 and 25) that is mounted by bolts 1209 on a bracket 1210 secured to and projecting upwardly from the plate 1011 of the stationary frame structure 1005. The bracket has vertical slots 1210a which permit raising or lowering of the cam plate. Since the cam plate 1208 is adjustable on the bracket 1210, the movement of the collar 1186 may be adjusted to regulate the amount the cutting edges move out of the impaling rod. It will be noted in FIG. 16 that, when the roller 1206 is raised, the collar 1186 is moved to the right, causing the cutting edge of the cutter to be moved out of the impaling tube. When the roller 1206 is moved downwardly, the collar 1186 is moved toward the left, causing the cutting edges to be withdrawn into the impaling tube.

Accordingly, the cam 1208 (FIG. 25) has an upwardly inclined camming surface 1208a that causes the roller 1206 to be raised, and a surface 1208b that moves the roller downwardly.

The pear is cored by rotating the coring rod 1067 while the pear is held in stationary position by the four clamp pads. Rotation of the coring rod is effected through a flexible belt 1207 (FIG. 21) that has teeth formed on one surface. The belt 1207 is disposed around the gear 1160 on the end of the rotatable tube 1155, around an idler gear 1211 which is rotatably mounted on a rod 1212 secured in the high wall 1045, around a drive gear 1213 rotatably mounted on a bushing 1214 disposed on the upper end of the shaft 1002, and around an idler gear 1215 (FIG. 16). The drive gear 1213 is keyed, in any suitable manner, to a gear 1216 (FIGS. 21 and 23) that is adapted to be moved into meshing engagement with a gear segment 1217 (FIGS. 24 and 25) as the head 1000 is carried around the coring turret. The gear segment 1217 is pivotally mounted by a pin 1218 on a rail 1219 that is mounted in spaced relation above the cam mounting plate 1011. A spring 1220 (FIG. 24) urges the gear segment 1217 inwardly.

A splitting blade 1221 (FIGS. 16 and 18) is mounted between spaced arms 1222 and 1223 of a blade holder 1224 which has a yoke 1226 (FIG. 16) mounted for pivoting movement on a shaft 1228 disposed in a flange 1230 projecting outwardly from the lower portion of the boss 1041 at the front of the housing. The blade holder 1224 is normally held in the retracted position of FIG. 18 by means of a spring 1232 which is connected between a tab 1233 secured to the flange 1230 and a pin 1234 disposed in the upper portion of the blade holder. At the end of the coring and trimming operation the splitting blade 1221 is swung up to a position of alignment with the impaling rod 1067 by means of a cam roller 1240 (FIG. 23) that is rotatably mounted on an arm 1241 of the blade holder 1224. The roller 1240 (FIG. 16) rides along the surface of a cam 1244 mounted on the cam mounting plate 1011 (FIG. 25). The cam 1244, which is resiliently mounted, has an upwardly inclined camming surface 1244a that raises the roller 1240 and pivots the blade holder counter-clockwise (FIG. 18) to bring the blade into a vertical plane through the impaling rod. If desired, the camming surface 1244a may be designed so that the blade holder is at first gradually moved toward an erect position and then rapidly moved to bring the blade to a vertical position at exactly the correct time. A flat camming surface 1244b (FIG. 25) holds the blade in the vertical position. The blade has a recess formed in its cutting edge and this recess receives the end of the coring rod when the blade is swung up to a position of alignment with the rod.

After the pear has been cored and trimmed and the splitting blade is in aligned position with the impaling rod, the pear is pushed off the rod by a pusher lever 1250 (FIGS. 21 and 23) which has an offset yoke 1251 at its upper end. A block 1252, which is pivotally mounted on the yoke, has a recess 1252b adapted to receive the impaling rod 1067, and a vertical slot 1252a arranged to receive the sharpened end of the blade 1221 during the push off operation. Near its lower end the pusher lever 1250 is secured, in any suitable manner, to a shaft 1253 that is journalled for rotation in the side walls of the housing. The shaft 1253 (FIG. 21) has an annular groove 1254 into which a ball 1255 is pressed by a spring 1256. The spring is disposed in an elongated hole 1258 in the front wall of the housing and is adjustably held therein by a setscrew 1260 (FIG. 23) which is threaded into the end portion of the hole 1258. It will be seen in FIG. 21, that the spring loaded ball 1255 will normally engage an end wall 1254a of the annular groove 1254 and will hold the pusher lever in a predetermined inward position. It will be appreciated that when the unit 1000 is moved around the coring turret, centrifugal force will tend to pivot the lever 1250 and move the block 1252 to an outer position on the impaling rod 1067 where they might interfere with the operation of the clamping pads.

When the pear is ready to be discharged, the pusher lever 1250 is swung counterclockwise (FIG. 23) by means of a cam roller 1264 that is rotatably mounted on an arm 1265 of the lever 1250. The roller 1264 is arranged to ride in a cam track 1266 (FIG. 25) that has an upwardly inclined entrance camming surface 1266a, and a downwardly inclined surface 1266b that forces the roller 1264 downwardly to pivot the pusher lever 1250 in a direction adapted to move the block 1252 outwardly along the impaling tube to eject the pear. The cam track 1266 also has an upwardly inclined camming surface 1266c which raises the roller 1264 and moves the pusher blocks rearwardly along the impaling rod. It will be understood that when a pear is impaled on the impaling rod it will contact the pusher block 1262 which will slide rearwardly to accommodate the pear. When the pusher lever is pivoted by the cam to eject a pear, the resistance of the spring loaded ball 1255 in the groove is overcome and the pusher lever passes through the position in which it would normally be held by the spring loaded ball 1255, if there were no pear on the impaling rod.

As a pear is pushed onto the impaling rod 1067, the upper surface of the pear is penetrated by a sharpened fin 1269 (FIG. 21) which is secured in depending relation on the lower surface of an arm 1270. The arm 1270 has a curved outer end and is pivotally mounted on a pin 1271 which is fixed in a bracket 1274 secured to the high wall 1045. The arm 1270 (FIG. 23) has a bar 1276 projecting from one side face, and a spring 1277, connected between the bar 1276 and the wall 1045, urging the arm 1270 downwardly until the end of the bar 1276 abuts the edge of the bracket 1274. The fin 1269, which assists the clamps in preventing rotation of the pear, is disposed in a vertical plane. Since the fins of the stemming tube of the main turret are also disposed in a vertical plane, the cuts made by all the fins will be in the same plane. The fin 1269 also holds the pear against displacement as the pear is pushed on and off the impaling rod 1067.

In operation, the head 1000 is brought into alignment with the stemming tube 72 of the main turret as shown in FIG. 21. It is to be noted that the impaling rod 1067 of the unit has a tapered outer end that terminates in a cylindrical portion adapted to fit into the end of the stemming tube. When the stemming tube 72 and the impaling rod 1067 are in alignment, the stemming tube is moved radially outwardly from the main turret, by means of an actuating mechanism described in the aforementioned parent application, and the end of the impaling rod pilots the stemming tube into perfect alignment, as shown in FIG. 21. The butt stop 75 is then moved outwardly from the main turret to push the pear from the stemming tube 72 to the impaling rod 1067. As the pear is impaled on the rod 1067, the upper surface of the pear is penetrated by the sharpened fin 1269 of the spring-loaded arm 1270. At this time, the roller 1076 (FIG. 16), that controls the clamp pads, is disposed on the inclined camming surface 1077b (FIG. 24). Accordingly, the side pads 1061 and 1063 are urged inwardly by the spring 1072, the lower pad is urged inwardly by the spring 1100, and the upper pad 1060 is urged downwardly by the spring 1126.

As the head 1000 moves around the turret the pusher lever roller 1264 rides up the camming surface 1266a to pivot the pusher to a rearward position on the impaling rod. The gear 1216 then moves into engagement with the gear segment 1217 (FIG. 24) to start the rotation of the impaling rod 1067. Shortly after the rod 1067 begins to rotate, the roller 1206 (FIG. 21), which controls the pivoting of the cutter in the impaling rod, rides up the upwardly inclined surface 1208a of the cam plate 1208 causing the cutting edges to be progressively moved out of the slot of the rotating impaling rod 1067. The rotation of the cutter in the pear tends to displace the pear and move the upper and lower clamp pads outwardly from the pear. However, outward movement of the pads 1060 and 1062 is prevented because such movement cocks the racks 1110 and 1080 in their slidable mounting. Accordingly, the upper and lower clamp pads are effectively locked in position. When the seed cell and the calyx end of the pear have been cut, the cutter is retracted as the roller 1206 is forced downwardly by the camming surface 1208b.

The splitting blade 1221 is then swung up to a vertical position by the engagement of the roller 1240 (FIG. 23) with the camming surface 1244a, and is held in the vertical position by the flat camming surface 1244b. When the splitting blade is in position, the clamp pads are swung to their open position by the engagement of the roller 1076 with the camming surface 1077a. The pusher lever 1250 (FIG. 23) is then swung counterclockwise by the engagement of the roller 1264 with the camming surface 1266b (FIG. 25) to force the pear off the impaling rod and over the splitting blade. The halves of the pear drop into a suitable discharge chute (not shown). The roller 1264 rides up the camming surface 1266c and retracts the pusher block. As the block moves rearwardly, the splitting blade 1221 is swung to its normal position of FIG. 18 as the roller 1240 moves down off the camming surface 1244b.

The head 1000 will then be ready to receive another pear from the stemming tube 72 of the main turret.

It is sometimes desirable to leave the pear in a whole condition after it has been peeled, cored and trimmed. The coring and trimming head 1000 may be easily adapted to such a process since, when the blade 1221 is removed from the blade holder 1224, the pears will be discharged from the head without being split. It is also evident that, if it is necessary or desirable to cut the pear into more than two pieces, the blade 1221 (FIG. 18) may be replaced by a cutter having a plurality of blades. For example, a cutter having two blades crossed at 90 degrees would cut the pear into four sections. It is therefore evident that the head 1000 is flexible in its use and makes the machine adaptable for carrying out different fruit preparation processes.

From the foregoing description it will be recognized that the present invention provides a mechanism for performing the functions of removing the seed cell from a pear, trimming the blossom-end of the pear, and discharging the meat of the pear in either a split or whole form.

While a preferred apparatus for carrying out the invention has been shown and described, it will be understood that it is capable of modification and variation while still employing the principles of the invention. It is to be understood, therefore, that the scope of the invention should be limited only by the scope and proper interpretation of the claims appended hereto.

Having thus described the invention, that which is believed to be new and for which protection by Letters Patent is desired, is:

1. In a fruit preparation machine, a turret mounted for rotation about a vertical axis, an impaling tube mounted on said turret and projecting radially outwardly therefrom, said impaling tube being adapted to support a pear impaled thereon, a splitting blade mounted for movement along a predetermined curved path and adapted to be positioned in alignment with the axis of said impaling tube during a portion of said movement, drive means for moving said turret and said splitting blade in timed relation, said drive means being arranged to bring said splitting blade closely adjacent the free end of said tube and into alignment with said impaling tube at a predetermined point in their respective paths of movement, a pusher member mounted on said turret and having a portion movable along said impaling tube upon actuation of said pusher member to engage the pear on said tube and move it toward the free end of said tube and across said splitting blade when said tube and blade are in aligned relation, and means responsive to the movement of said turret and connected to said pusher member to actuate said pusher member when said blade and tube are in aligned relation.

2. In a fruit preparation machine, a first turret mounted for rotation about a vertical axis, an impaling tube mounted on said turret for movement in a predetermined path and adapted to support a pear impaled thereon, said impaling tube projecting radially outward of said turret, a second turret mounted for rotation about a vertical axis adjacent said first turret, a splitting blade mounted on said second turret for movement in a path a portion of which is disposed closely adjacent and concentric with the path of said impaling tube, means for rotating said first turret, drive means on said first turret disposed in driving engagement with said second turret to drive said second turret in timed relation with said first turret, the driving connection between said turrets being synchronized to bring said impaling tube into alignment with said splitting blade during the portion of their paths of movement when said blade is closely adjacent said impaling tube, a pusher member mounted on said first turret for movement from a position adjacent the rearward end of said tube forwardly toward the free end thereof, and means synchronized with the movement of said turret for actuating said pusher member to move it outwardly along said tube when said tube and blade are in aligned position.

3. In a fruit preparation machine, a clamp mechanism comprising a support housing, a pair of rods rotatable in said housing and projecting outwardly thereof in parallel relation, a clamping pad mounted on each rod in confronting relation to a pad on the other rod, a lever keyed to each rod internally of said housing, a shaft rotatable in said housing, wedge rings rotatable on said shaft, each ring having a wedging surface closely adjacent an arm of one of said levers, torsion spring means connected between said housing and said wedge rings and arranged to urge said rings in a direction to move said wedging surfaces into engagement with the associated lever arms, means for preloading said torsion springs, and means for latching said shaft with said springs in preloaded condition, whereby release of said latch means will permit said wedging surfaces to be urged into engagement with said lever arms due to the preload on said springs.

4. In a fruit preparation machine, a support member, a splitting blade rigidly mounted on said support member in a vertical plane, means for positioning a pear with the stem-blossom axis of the pear in the vertical plane of said blade, means for moving the pear from said positioning means onto said blade to split the pear, clamp means disposed on opposite sides of said splitting blade in position to engage and hold the pear halves against the splitting blade, and a pressure applying means operatively connected between said support member and said clamp means and including a plurality of spring-loaded wedges adapted to apply pressure to said clamp means to cause said clamp means to press the pear halves against the blades with a predetermined pressure.

5. In a fruit preparation machine, an apertured splitting blade mounted in a fixed position, means for holding a pear on said splitting blade with the seed cell opposite the aperture in said blade, a shaft mounted for rotation in said blade and extending through said aperture, a pair of curved cutting blades secured to and projecting from diametrically opposite sides of the portion of said shaft in said aperture, each cutting blade being secured at its opposite ends to said shaft and having an intermediate portion disposed in spaced relation to the shaft, and means for rotating said shaft approximately 180 degrees to sever the seed cell of the pear and then rotating said shaft approximately 90 degrees to dispose the curved cutting blades in laterally spaced relation to the plane of the splitting blade to form a cage-like structure adapted to retain the seed cell in the aperture in the splitting blade.

6. A coring unit for a fruit preparation machine comprising a support structure, a housing mounted for movement along a fixed path on said support structure, a splitting blade mounted on said housing, said blade having a sharpened forward edge and having an aperture therein spaced rearwardly from said edge, a shaft journalled in said blade and extending across said aperture, a cutter keyed to said shaft, a first cam follower operatively connected to said cutter shaft and arranged upon being actuated to rotate said shaft, means for moving a pear over the forward edge of said blade and positioning the pear with the seed cell of the pear opposite said cutter, a plurality of clamping members pivotally mounted on said housing on opposite sides of said blade, spring means connected to said clamping members for pivoting said members toward closed position against a pear on said blade, a second cam follower operatively connected to said clamping members and arranged to pivot said members to open position upon being actuated, a pusher member having a portion mounted for sliding movement along each side of said splitting blade from the rear of the blade toward said forward sharpened edge, a third cam follower carried by said pusher member and arranged to slide said pusher member along said blade upon being actuated, and cam means on said support structure arranged to successively actuate said first cam follower to rotate said cutter and sever the seed cell of the pear, actuate said second cam follower to pivot said clamping members to open position, and actuate said third cam follower to slide the portions of said pusher member forwardly along said splitting blade to eject the pear halves therefrom.

7. A coring unit for a fruit preparation machine comprising a support structure, a housing mounted on said structure for movement in a fixed path, a tube on said housing adapted to receive and support a pear thereon, a plurality of clamping members pivotally mounted on said housing for movement between a closed position in gripping engagement with a pear on said tube and an open position spaced from said tube, a control lever mounted in said housing and operatively connected to said clamping members to pivot said members between open and closed positions, a cam follower on said control lever, a latch plate on said lever and having two adjacent teeth, a latching lever pivotally mounted on said housing and having a tooth adapted to be moved into engagement with with either of the teeth on said latch plate, a spring connected between said housing and said latching lever and arranged to pivot said lever in a direction to move the tooth of said lever into engagement with a tooth on said latch plate, a first cam mounted on said support structure and adapted to engage and actuate said cam follower to pivot said control lever in a direction to open said jaws, said spring means being arranged to pivot said latching lever and move the tooth of said latching lever into engagement with one of said teeth on said latch plate while said clamping members are in open position, and a second cam mounted on said support structure at a point spaced forwardly from said first cam in the direction of movement of the housing and arranged to contact said latching lever and pivot it in a direction to move the tooth thereon out of engagement with the tooth on said latching plate, permitting said spring loaded clamping members to move toward closed position.

8. In a fruit preparation machine, a housing having a plurality of guide passages, an impaling rod rotatably mounted on said housing and adapted to support a pear impaled thereon, means defining a longitudinal slot in said rod, a cutter pivotally mounted in said slot and having a cutting edge movable out of said slot as said cutter is pivoted in a fixed direction, a plurality of clamping pad support rods slidably mounted in said guide passages at points spaced axially of said rod from said cutting edges, a clamping pad on each support rod adapted to exert pressure against a pear on said rod to hold the pear against rotation, and means for simultaneously rotating said rod and pivoting said cutter in said fixed direction to move said cutting edges out of said slot and into engagement with the non-rotating pear on said rod, said support rods being so mounted in said guide passages that displacement of said pads away from the pear pivots each rod into cocked position in its passage whereby to lock said pads against further movement away from said pear.

9. In a fruit rotary preparation machine, a first support member, an impaling tube mounted on said support member for movement in a circular path and projecting radially outwardly of said circular path and having a tapered internal surface at its end, a second rotary support member adjacent said first support member, impaling means mounted on said second support member for movement in a path a portion of which is disposed closely adjacent and concentric with the path of said impaling tube, said means having a tapered forward end portion, means for moving said first and second rotary support members for disposing said impaling means and said tube in end-to-end relation, and means for moving said tube toward said impaling means to dispose the tapered end of said impaling means in contact with the tapered internal surface of said tube.

10. In a fruit preparation machine, a circular continuously driven first rotary support member, an impaling tube mounted on said first support member and having a tapered internal surface at its end, a second continuously driven support member disposed adjacent said first support member and movable along a path having an arcuate portion concentric with the path of movement of said first support member, impaling means mounted on said second support member and having a tapered forward end portion, means on said first rotary support member for disposing said impaling means and said tube in end-to-end relation and for moving said tube toward said impaling means to dispose the tapered end of said impaling means in contact with the tapered internal surface of said tube, pusher means on said first rotary support member for transferring a pear from said impaling tube to said impaling means when said tube and impaling means are aligned and with the axis of said pear centered on said impaling means, clamp means on said second support member disposed on opposite sides of said impaling means for gripping the pear and holding the pear while on said impaling means, and pressure applying means operatively connected between said second support member and said clamp means and including a plurality of wedges to aid in controlling the movement of said clamping means and for applying pressure to said clamping means.

References Cited in the file of this patent

UNITED STATES PATENTS

| | | |
|---|---|---|
| 1,583,100 | Reynolds | May 4, 1926 |
| 2,139,704 | Thompson et al. | Dec. 13, 1938 |
| 2,447,640 | Dunn | Aug. 24, 1948 |
| 2,459,368 | Dunn | Jan. 18, 1949 |
| 2,526,712 | Thompson | Oct. 24, 1950 |
| 2,740,441 | Coons | Apr. 3, 1956 |
| 3,018,179 | Coons et al. | Jan. 23, 1962 |